(12) United States Patent
Shindo et al.

(10) Patent No.: US 11,548,204 B2
(45) Date of Patent: Jan. 10, 2023

(54) METHOD FOR MANUFACTURING HIGH-PRESSURE TANK

(71) Applicant: TOYOTA JIDOSHA KABUSHIKI KAISHA, Toyota (JP)

(72) Inventors: Tatsunori Shindo, Nisshin (JP); Kazuyo Wakasugi, Nagoya (JP); Masayoshi Takami, Hamamatsu (JP); Yasunori Nosaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/144,608

(22) Filed: Jan. 8, 2021

(65) Prior Publication Data
US 2021/0237335 A1 Aug. 5, 2021

(30) Foreign Application Priority Data
Jan. 30, 2020 (JP) .............................. JP2020-013113

(51) Int. Cl.
*B29C 53/60* (2006.01)
*F17C 1/06* (2006.01)
*B29L 31/00* (2006.01)

(52) U.S. Cl.
CPC .............. *B29C 53/602* (2013.01); *F17C 1/06* (2013.01); *B29L 2031/7156* (2013.01);
(Continued)

(58) Field of Classification Search
CPC .................. F17C 2209/221; F17C 1/16; F17C 2203/067; F17C 2209/232;
(Continued)

(56) References Cited

U.S. PATENT DOCUMENTS 5,518,568 A * 5/1996 Fawley .................. B29C 70/50
156/289
2007/0246475 A1 10/2007 Mazabraud et al.
(Continued)

FOREIGN PATENT DOCUMENTS

| CN | 106696302 A | 5/2017 |
|---|---|---|
| JP | 2007015329 A | 1/2007 |

(Continued)

OTHER PUBLICATIONS

Journal of the Japan Society of Colour Material, vol. 68, No. 7, 424-433 (1995), Mechanism of Adhesion of Organic Compounds to Metal Surfaces, 10 pages. (See detailed explanation).

*Primary Examiner* — Vishal I Patel
(74) *Attorney, Agent, or Firm* — Hunton Andrews Kurth LLP

(57) ABSTRACT

A method for manufacturing a high-pressure tank including a liner that stores gas and a reinforcing layer made of a fiber-reinforced resin and covering an outer surface of the liner includes: a first step of forming a cylinder member made of the fiber-reinforced resin; a second step of forming two dome members made of the fiber-reinforced resin; and a third step of forming a reinforcing body that is the reinforcing layer by joining both end portions of the cylinder member and end portions of the two dome members, respectively. The first step includes forming the cylinder member by winding a release material around a mandrel and winding the fiber-reinforced resin on the release material.

4 Claims, 16 Drawing Sheets

(52) U.S. Cl.
CPC ............... *F17C 2201/0109* (2013.01); *F17C 2203/067* (2013.01); *F17C 2209/2163* (2013.01); *F17C 2209/232* (2013.01)

(58) Field of Classification Search
CPC ...... F17C 2203/0609; F17C 2201/0109; F17C 1/06; F17C 2201/056; F17C 2201/058; F17C 2203/0621; F17C 2209/2163; F17C 2221/012; F17C 2205/0305; F17C 2223/0123; F17C 2203/0673; F17C 2203/0604; F17C 2221/035; F17C 2221/033; F17C 2203/0663; F17C 2223/0153; F17C 2223/0161; F17C 2223/033; F17C 2223/036; B29C 53/602; Y02E 60/32; B29L 2031/7156
See application file for complete search history.

(56) References Cited

U.S. PATENT DOCUMENTS

| | | | | |
|---|---|---|---|---|
| 2008/0087371 | A1* | 4/2008 | Friedrich | B29C 70/205 |
| | | | | 156/166 |
| 2010/0294776 | A1 | 11/2010 | Liu | |
| 2017/0136716 | A1* | 5/2017 | Shindo | B29C 70/86 |

FOREIGN PATENT DOCUMENTS

| | | |
|---|---|---|
| JP | 2008501546 A | 1/2008 |
| JP | 2012149739 A | 8/2012 |

* cited by examiner

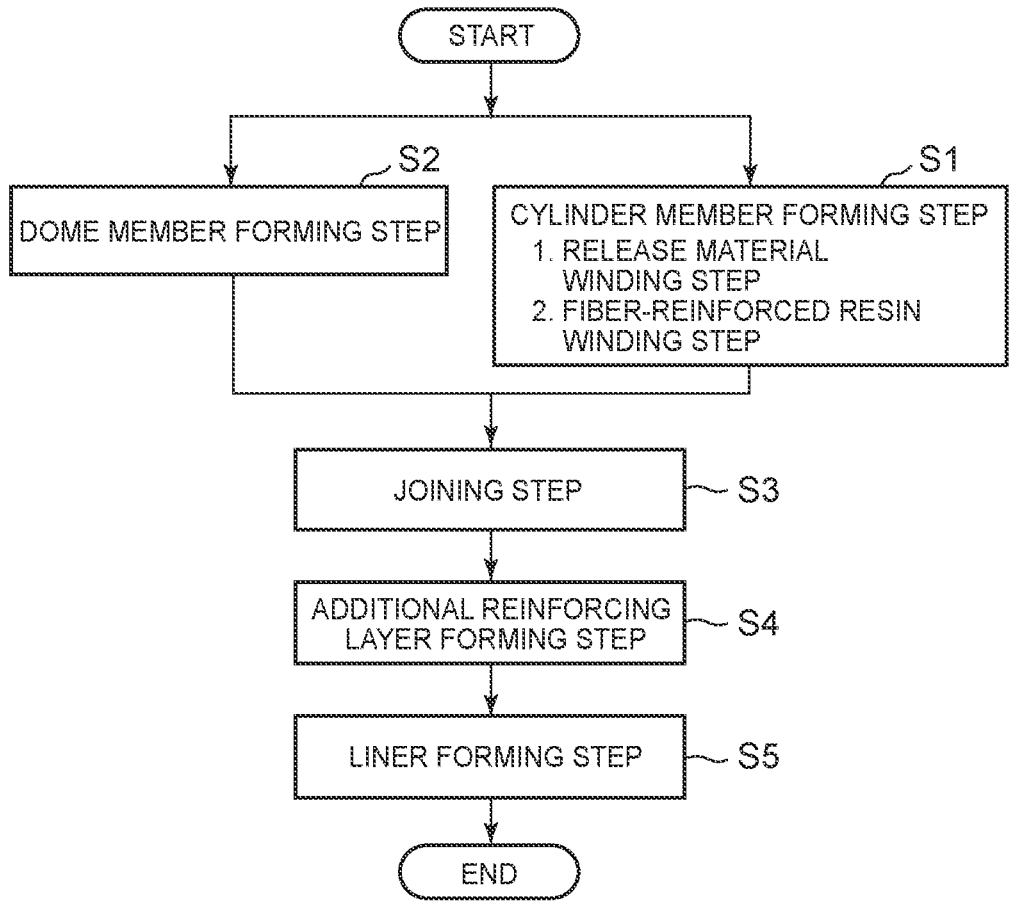
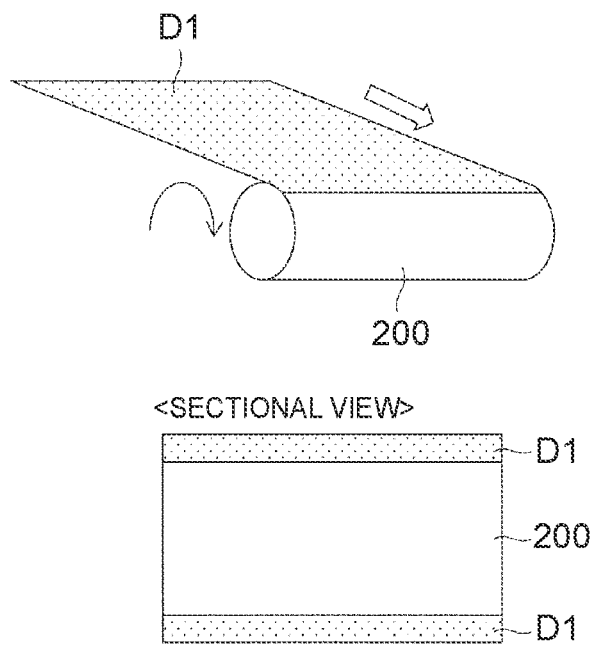

FIG. 6
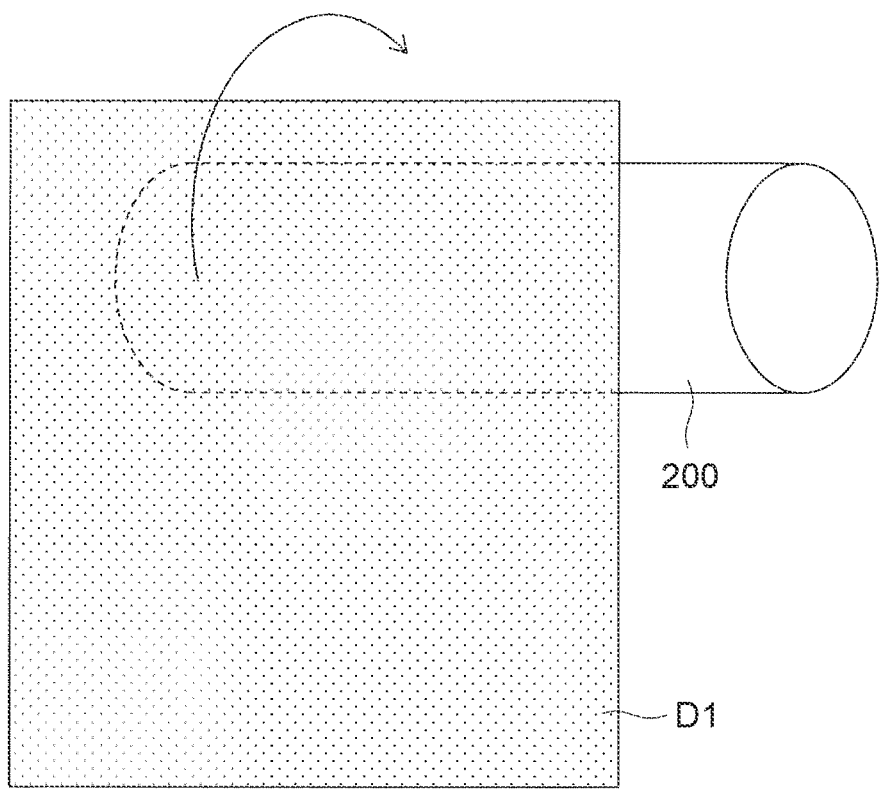
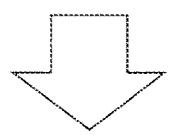
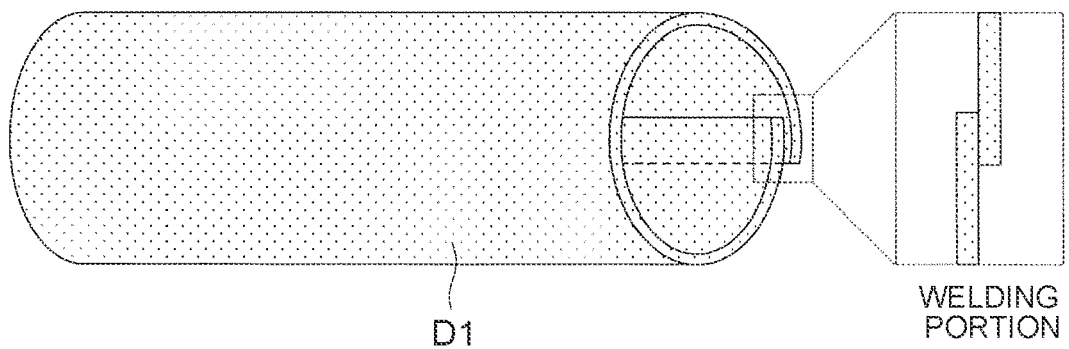

FIG. 7
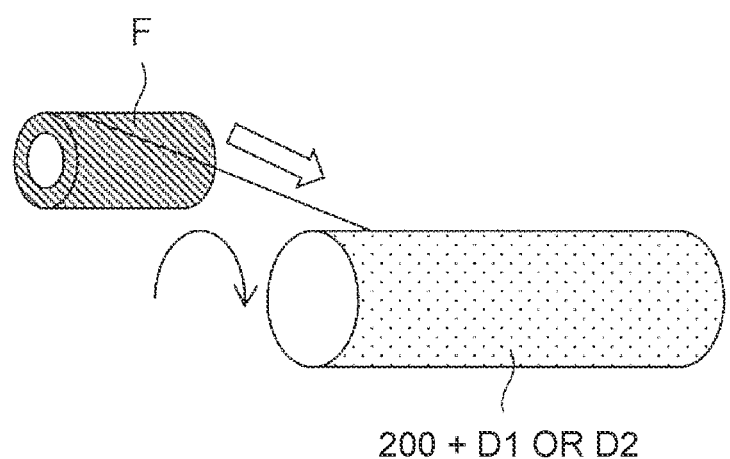
200 + D1 OR D2
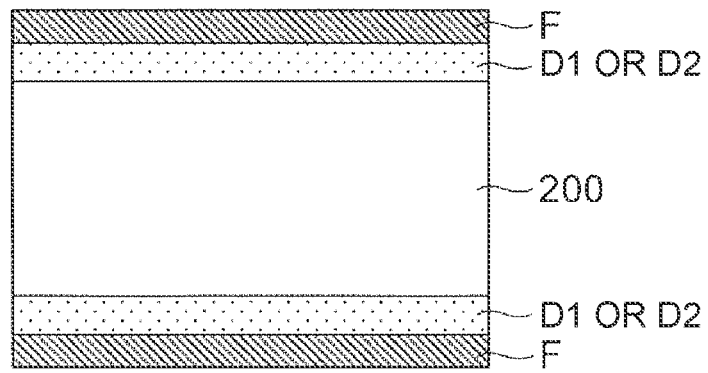
FIG. 8
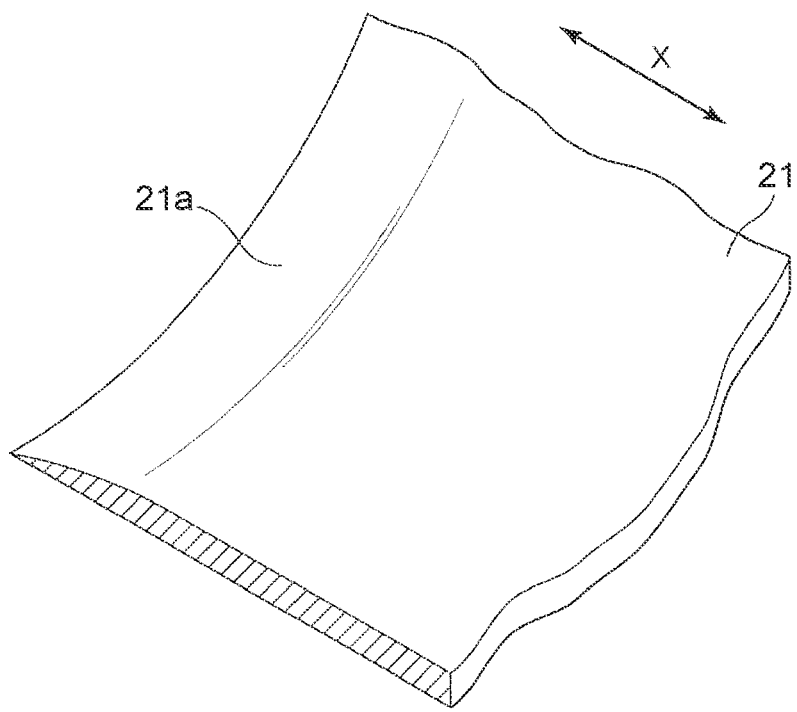

METHOD FOR MANUFACTURING HIGH-PRESSURE TANK

CROSS-REFERENCE TO RELATED APPLICATION

This application claims priority to Japanese Patent Application No. 2020-013113 filed on Jan. 30, 2020, incorporated herein by reference in its entirety.

BACKGROUND

1. Technical Field

The disclosure relates to methods for manufacturing a high-pressure tank including a liner that stores gas and a fiber-reinforced resin layer made of a fiber-reinforced resin and covering the outer surface of the liner.

2. Description of Related Art

A tank including a tank body and a boss attached to an opening end in the longitudinal direction of the tank body is conventionally known as a high-pressure tank that is used to store and supply hydrogen, etc. For example, the tank body includes a liner for holding hydrogen gas airtight and a fiber-reinforced resin layer formed by winding a fiber bundle of a fiber-reinforced resin around the liner to reinforce the liner.

For example, Japanese Unexamined Patent Application Publication (Translation of PCT Application) No. 2008-501546 (JP 2008-501546 A) and US 2010/0294776 A describe a high-pressure tank and a method for manufacturing the high-pressure tank.

In a known method for manufacturing a high-pressure tank, a fiber-reinforced resin layer is formed by winding a fiber bundle around a liner by, for example, a filament winding process (hereinafter also simply referred to as the "FW process") and curing the fiber bundle.

For example, Japanese Unexamined Patent Application Publication No. 2012-149739 (JP 2012-149739 A) discloses a high-pressure tank including a liner and a fiber-reinforced plastic layer (fiber-reinforced resin layer) covering the outer surface of the liner. The fiber-reinforced plastic layer is comprised of hoop layers formed by hoop-winding a resin-impregnated fiber bundle around the liner and helical layers formed by helically winding a resin-impregnated fiber bundle around the entire liner. The fiber-reinforced plastic layer is comprised of a hollow cylindrical cylinder section formed by the hoop layers and the helical layers and a pair of dome sections, each of which is provided at both ends of the cylinder section and formed by the helical layers.

SUMMARY

In such a high-pressure tank as described in JP 2012-149739 A, the hoop layers provide the strength of the cylinder section, and the helical layers provide the strength of the dome sections. That is, the helical layers are also formed in the cylinder section but hardly contribute to the strength of the cylinder section. However, in the case where the fiber bundle is helically wound across both ends of the liner, the fiber bundle necessarily passes across the cylinder section. Accordingly, helically winding the amount of fiber bundle required to provide sufficient strength of the dome sections unnecessarily increases the usage of the fiber-reinforce resin as the helical layers are also formed around the cylinder section.

A method for manufacturing a high-pressure tank which can reduce the usage of a fiber-reinforced resin is desired in order to address this problem. The applicant found, as an alternative to the conventional method for manufacturing a high-pressure tank, a method for manufacturing a high-pressure tank including a liner that stores gas and a reinforcing layer made of a fiber-reinforced resin and covering the outer surface of the liner. This method includes: forming a cylinder member made of the fiber-reinforced resin; forming two dome members made of the fiber-reinforced resin; and forming a reinforcing body that is the reinforcing layer by joining both end portions of the cylinder member and end portions of the two dome members.

In the above method for manufacturing a high-pressure tank, a mandrel (predetermined die) is used to manufacture the cylinder member. In the case where the fiber-reinforced resin for the cylinder member is brought into direct contact with the mandrel with no release agent applied therebetween, the fiber-reinforced resin adheres to, and in some cases, bonds to, the mandrel. Accordingly, when trying to remove the formed cylinder member from the mandrel, the bonding portion is subjected to excessive stress and the reinforcing layer may be damaged. Even when the formed cylinder member can be removed from the mandrel, smoothness of the inner layer surface of the cylinder member is lost, which makes it difficult to mold or insert the liner subsequently.

FIG. 24 schematically illustrates a presumed mechanism of bonding of the fiber-reinforced resin to the mandrel. FIG. 24 illustrates a mechanism of adhesion of epoxy resin by Glazer (see J. Glazer, J. Polymer Sci., 13, 355 (1954)). As can be seen from FIG. 24, the epoxy resin that can be included in the fiber-reinforced resin is adhesive to various materials, and it is presumed that the epoxy resin bonds to the mandrel due to the interaction between the epoxy resin and the mandrel (i.e., hydrogen bonds between the epoxy resin and hydroxyl groups that are present at the surface of the mandrel) which occurs when the epoxy resin is thermally cured.

The disclosure provides the above method for manufacturing a high-pressure tank, namely the method for manufacturing a high-pressure tank in which the cylinder member and the two dome members are joined together and which allows easy removal of the cylinder member from the mandrel.

Through examination of various solutions to the above problem, the inventor found that the cylinder member can be easily removed from the mandrel by the following method. When manufacturing a high-pressure tank including a liner that stores gas and a reinforcing layer made of a fiber-reinforced resin and covering an outer surface of the liner by a manufacturing method including: a first step of forming a cylinder member made of the fiber-reinforced resin; a second step of forming two dome members made of the fiber-reinforced resin; and a third step of forming a reinforcing body that is the reinforcing layer by joining both end portions of the cylinder member and end portions of the two dome members, respectively, the cylinder member made of the fiber-reinforced resin is formed after a release material is wound around a mandrel in the first step. The inventors completed the disclosure based on this finding.

Summary of the disclosure is as follows.

(1) A method for manufacturing a high-pressure tank including a liner configured to store gas and a reinforcing layer made of a fiber-reinforced resin and configured to cover an outer surface of the liner includes: a first step of forming a cylinder member made of the fiber-reinforced resin; a second step of forming two dome members made of the fiber-reinforced resin; and a third step of forming a reinforcing body that is the reinforcing layer by joining both end portions of the cylinder member and end portions of the two dome members, respectively. The first step includes forming the cylinder member by winding a release material around a mandrel and winding the fiber-reinforced resin on the release material.

(2) In the method according to (1), the release material in the first step may be a tubular body made of a heat shrinkable material and having an inside diameter larger than a diameter of the mandrel, and the release material may be wound around the mandrel by heat from outside.

(3) In the method according to (1) or (2), the release material in the first step may be made of a resin having gas barrier properties and may serve as the liner.

(4) In the method according to any one of (1) to (3), the release material in the first step may have a surface that is treated.

The disclosure thus provides a method for manufacturing a high-pressure tank in which a cylinder member and two dome members are joined together and which allows easy removal of the cylinder member from a mandrel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart of the method for manufacturing a high-pressure tank according to the embodiment of the disclosure;

FIG. 4 is a perspective view illustrating a first form of a release material winding step in a cylinder member forming step of the method for manufacturing a high-pressure tank according to the embodiment of the disclosure;

FIG. 6 is a perspective view illustrating a welded portion that can be formed in the release material winding step in the cylinder member forming step of the method for manufacturing a high-pressure tank according to the embodiment of the disclosure;

FIG. 7 is a perspective view illustrating one form of a fiber-reinforced resin winding step in the cylinder member forming step of the method for manufacturing a high-pressure tank according to the embodiment of the disclosure;

FIG. 8 is a perspective view illustrating the cylinder member forming step of the method for manufacturing a high-pressure tank according to the embodiment of the disclosure, showing a part of an end portion in the axial direction of a cylinder member;

DETAILED DESCRIPTION OF EMBODIMENTS

Figure 1:
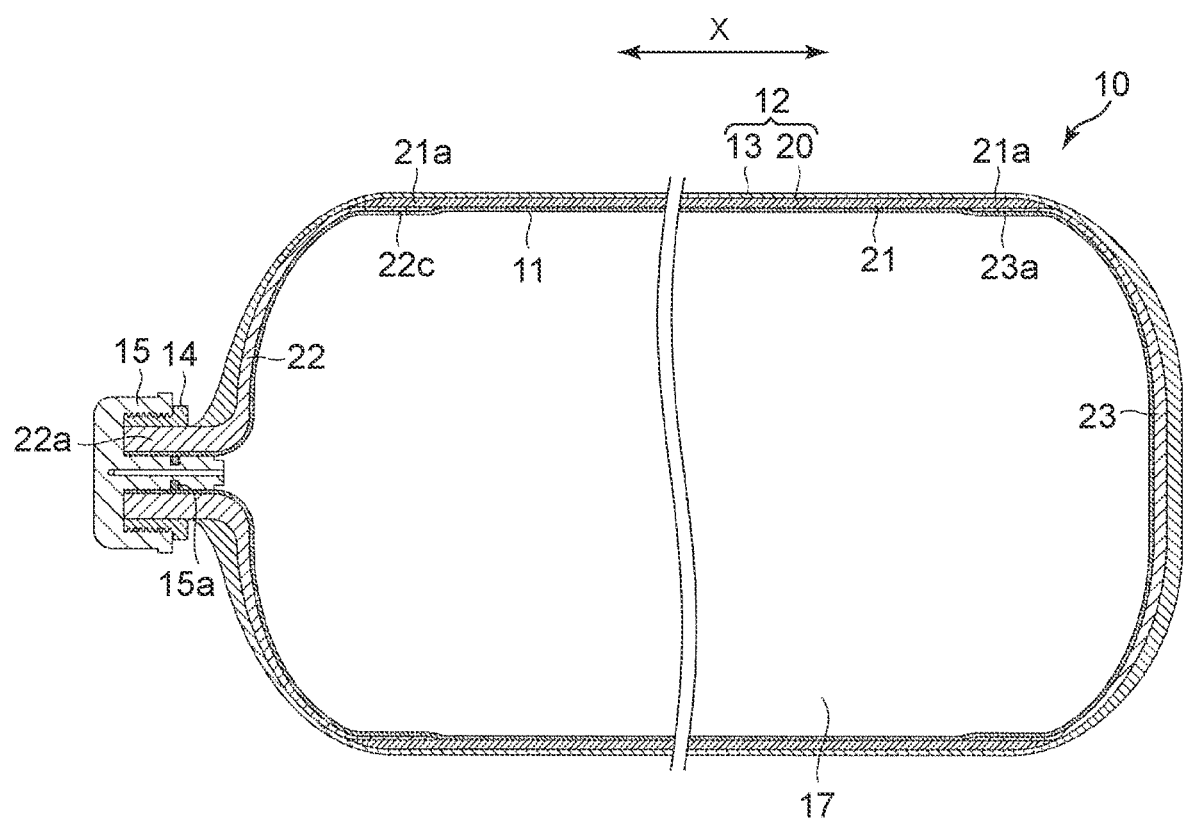
FIG. 1 is a sectional view illustrating the structure of a high-pressure tank that is manufactured by a method according to an embodiment of the disclosure.

A preferred embodiment of the disclosure will be described in detail.

In the specification, features of the disclosure will be described with reference to the drawings as needed. In the drawings, the dimensions and shapes of parts are exaggerated for clarity, and their actual dimensions and shapes are not accurately illustrated. Accordingly, the technical scope of the disclosure is not limited to the dimensions and shapes of the parts illustrated in the drawings. A method for manufacturing a high-pressure tank according to the disclosure is not limited to the embodiment described later, and may be carried out in various modified or improved forms etc. that can be made by those skilled in the art without departing from the spirit and scope of the disclosure.

The disclosure is a method for manufacturing a high-pressure tank including a liner that stores gas and a reinforcing layer made of a fiber-reinforced resin and covering an outer surface of the liner. The method includes: a first step of forming a cylinder member made of the fiber-reinforced resin; a second step of forming two dome members made of the fiber-reinforced resin; and a third step of forming a reinforcing body that is the reinforcing layer by joining both end portions of the cylinder member and end portions of the two dome members. The first step includes forming the cylinder member by winding a release material around a mandrel and winding the fiber-reinforced resin around the release material.

First Step

According to the above method for manufacturing the high-pressure tank, in the first step, the cylinder member is formed by winding the release material, for example, a sheet-like release material, around the mandrel and winding the fiber-reinforced resin around the release material. The release material can be a known material and is not particularly limited. However, the release material is, for example, a resin that is not altered at 100° C. to 170° C., which is the curing temperature of the fiber-reinforced resin, and that does not adhere or bond to the mandrel. Examples of such a resin include polyamide (PA), polyethylene terephthalate (PET), polytetrafluoroethylene (PTFE), epoxy (EP), and polycarbonate (PC). Since the fiber-reinforced resin does not directly contact the mandrel, the fiber-reinforced resin will not bond to the mandrel even when a release agent is not applied to the mandrel, namely even when a step of applying the release agent to the mandrel is omitted. Accordingly, the cylinder member including the release material and the fiber-reinforced resin can be easily removed from the mandrel.

In the above method for manufacturing the high-pressure tank, it is preferable that the release material in the first step be a tubular body made of a heat shrinkable material and having an inside diameter larger than a diameter of the mandrel. The tubular body is molded by blow molding etc., using the heat shrinkable material. The heat shrinkable material can be a known material. The heat shrinkable material is preferably a thin film, and examples of the heat shrinkable material include polyvinyl chloride (PVC), polypropylene (PP), polyethylene (PE), polystyrene (PS), and polyethylene terephthalate (PET). The tubular body has an inside diameter larger than the diameter of the mandrel and adjusted such that the tubular body is wound around the mandrel as it shrinks by heat from the outside. If the inside diameter of the tubular body is too large relative to the diameter of the mandrel, the tubular body will not be wound around the mandrel even when the tubular body shrinks by the heat from the outside. If the inside diameter of the tubular body is too small relative to the diameter of the mandrel, the tubular body will be tightly wound around the mandrel when the tubular body shrinks by the heat from the outside, and it will be difficult to remove the tubular body from the mandrel. The inside diameter of the tubular body is therefore appropriately adjusted according to the shrinkability of the heat shrinkable material. The heat from the outside is set to an optimal temperature based on the type of heat shrinkable material. In the case where the tubular body is used as the release material, the mandrel can be inserted into the tubular body, and the tubular body can be wound around the mandrel as the tubular body shrinks by the heat from the outside. In the case where, for example, a rectangular sheet is used as the release material, the end portions of the sheet come in contact with (abut on) each other or overlap each other and form a joint portion (welding portion) when the sheet is wound around the mandrel. However, a configuration having no welding portion is implemented using the tubular body as the release material.

According to the above method for manufacturing the high-pressure tank, it is preferable that the release material in the first step be made of a resin having gas barrier properties. The resin having gas barrier properties can be a known material, and examples of the resin having gas barrier properties include thermoplastic resins such as polyamide (PA), polyethylene (PE), ethylene-vinyl alcohol copolymer resin (EVOH), and polyester (PEs) and thermosetting resins such as epoxy (EP). The resin having gas barrier properties has, for example, a multilayer structure with an ethylene-vinyl alcohol copolymer resin interposed between polyamide or polyethylene. In the case where the resin having gas barrier properties is used as the release material, the release material can serve as the liner in the high-pressure tank, and a liner forming step can be omitted. In the case where the tubular body made of the resin having gas barrier properties is used as the release material, the cylinder member having no welding portion is implemented, which further improves the gas barrier properties of the high-pressure tank and suppresses leakage of gas such as hydrogen. An inspection process of checking for joining failure can therefore be omitted. In the case where the resin having gas barrier properties is used as the release material, the resin having gas barrier properties is placed on inner surfaces of the two dome members formed in the second step, and in the third step, the reinforcing body that is the reinforcing layer is formed by joining both end portions of the cylinder member and the end portions of the two dome members. When forming the reinforcing body in the third step, the liner is formed by joining, by, for example, welding, end portions of the release material included in the cylinder member and end portions of the resin having gas barrier properties placed on the inner surfaces of the two dome members.

According to the above method for manufacturing the high-pressure tank, it is preferable that the release material in the first step be surface-treated before the release material is wound around the mandrel. The surface treatment for the release material is performed on the side of the release mandrel which is to come into contact with the mandrel and/or come into contact with the fiber-reinforced resin. The surface treatment for the release material can be a known surface treatment. For example, plasma treatment, flame treatment, or corona treatment can be used in order to increase the number of surface functional groups, that is, to improve wettability. For example, in the case where the side of the release material which is to come into contact with the mandrel is surface-treated, an inner surface of the cylinder member after removal from the mandrel has improved wettability. Accordingly, a resin for the liner can be molded uniformly in the cylinder member when forming the liner using rotational molding etc. after the third step. For example, in the case where the side of the release material which is to come into contact with the fiber-reinforced resin is surface-treated, the bonding force between the release material and the fiber-reinforced resin can be controlled. Depending on the design concept and method, etc., any of the following can be selected: the release material included in the cylinder member is peeled off from a fiber-reinforced resin layer; when, for example, the resin having gas barrier properties is used as the release material, the release material is fixed, as a part of the liner, to the fiber-reinforced resin layer; and the release material is fixed, as a resin with improved wettability, to the fiber-reinforced resin layer such that the resin for the liner can be molded uniformly in the cylinder member when forming the liner using rotational molding etc.

According to the above method for manufacturing the high-pressure tank, it is preferable that the cylinder member made of the fiber-reinforced resin be formed on the release material in such a manner that fibers in the cylinder member are oriented in a circumferential direction of the cylinder member. Since the fibers in the cylinder member are oriented in the circumferential direction, the strength of the fiber-reinforced resin layer against hoop stress that is generated by a gas pressure is provided by an appropriate amount of fiber-reinforced resin.

The cylinder member may be formed by producing a plurality of the cylinder members in the first step and connecting end portions of the cylinder members. With this configuration, even a long cylinder member can be easily formed.

Second Step

According to the above method for manufacturing the high-pressure tank, the two dome members made of the fiber-reinforced resin are formed in the second step. Since the two dome members are thus formed separately from the cylinder member using an appropriate amount of fiber-reinforced resin, the usage of the fiber-reinforced resin for the cylinder member is not increased due to formation of the dome members.

In the above method for manufacturing the high-pressure tank, it is preferable that the two dome members be formed by winding a resin-impregnated fiber bundle around a predetermined die in such a manner that the fiber bundle covers an outer surface of the predetermined die and then dividing the resultant winding body of the fiber bundle wound around the predetermined die into two parts. With this configuration, the fiber bundle can be easily wound around the predetermined die using, for example, the FW process, and the two dome members can be easily formed by dividing the winding body of the fiber bundle into two parts and removing the two parts from the predetermined die.

According to the method for manufacturing the high-pressure tank, since the first step and the second step are independent of each other, the second step may be performed after the first step, the first step may be performed after the second step, or the first and second steps may be performed in parallel.

Third Step

In the above method for manufacturing the high-pressure tank, it is preferable that after thermally curing the cylinder member, the cylinder member and the dome members be joined together with the end portions of the cylinder member fitted in the end portions of the dome members. The strength of the cylinder member is thus increased in advance by the thermal curing. Accordingly, when fitting the cylinder member and the dome members together, the end portions of the dome members conform to the end portions of the cylinder member, and the end portions of the cylinder member functions as guide portions. The cylinder member and the dome members can thus be easily fitted together. In the case where the dome members are not thermally cured in advance, the dome members may deform when fitting the cylinder member and the dome members together. However, even when such deformation of the dome members occurs, the dome members can be pressed from the outside such that the dome members conform to the cylinder member. The outer shape of the dome members can thus be adjusted, or the dome members can be brought into close contact with the cylinder member.

In the above method for manufacturing the high-pressure tank, it is preferable that after thermally curing the two dome members, the dome members and the cylinder member be joined together with the end portions of the dome members fitted in the end portions of the cylinder member. The strength of the dome members is thus increased in advance by the thermal curing. Accordingly, when fitting the dome members and the cylinder member together, the end portions of the cylinder member conform to the end portions of the dome members, and the end portions of the dome members function as guide portions. The dome members and the cylinder member can thus be easily fitted together. In the case where the cylinder member is not thermally cured in advance, the cylinder member may deform when fitting the dome members and the cylinder member together. However, even when such deformation of the cylinder member occurs, the cylinder member can be pressed from the outside such that the cylinder member conforms to the dome members. The outer shape of the cylinder member can thus be adjusted, or the cylinder member can be brought into close contact with the dome member.

In the case where the resin having gas barrier properties is used as the release material in the first step, the resin having gas barrier properties is placed on the inner surfaces of the two dome members formed in the second step. In the third step, the liner is formed by joining, by, for example, welding, the end portions of the release material included in the cylinder member and the end portions of the resin having gas barrier properties placed on the inner surfaces of the two dome members.

Additional Reinforcing Layer Forming Step

In the above method for manufacturing the high-pressure tank, it is preferable that an additional reinforcing layer made of the fiber-reinforced resin and having fibers oriented across the two dome members be formed on an outer surface of the reinforcing body. The fibers in the additional reinforcing layer suppress separation of the dome members from the cylinder member. Coming off of the dome members from the end portions of the cylinder member by the gas pressure can be thus suppressed. The amount of fibers in the additional reinforcing layer need only be large enough to suppress coming off of the dome members from the cylinder member. Accordingly, the usage of the fiber-reinforced resin is reduced as compared to the helical layers formed in the cylinder section of the conventional high-pressure tank.

As described above, each part of the fiber-reinforced resin layer is formed using an appropriate amount of fiber-reinforced resin. Accordingly, the fiber-reinforced resin is not unnecessarily used, and the usage of the fiber-reinforced resin for the additional reinforcing layer that is formed on the cylinder member is reduced as compared to the conventional high-pressure tank.

In the above method for manufacturing the high-pressure tank, it is preferable that the additional reinforcing layer be formed by: placing a plurality of resin-impregnated fiber bundles in such a manner that the fiber bundles extend in an axial direction of the reinforcing body at predetermined intervals in a circumferential direction of the reinforcing body and at a predetermined distance from the outer surface of the reinforcing body; and rotating portions of the fiber bundles on a first end side relative to portions of the fiber bundles on a second end side in the circumferential direction of the reinforcing body. The portions of the fiber bundles on the first end side are thus rotated relative to the portions of the fiber bundles on the second end side in the circumferential direction of the reinforcing body. Accordingly, the fiber bundles are tilted with respect to an axial direction of the cylinder member, and gaps between the fiber bundles are eliminated and the fiber bundles partially overlap each other. The fiber bundles gradually approach the outer surface of the reinforcing body and are eventually placed onto the outer surface of the reinforcing body with no gap between the fiber bundles. At this time, the fiber bundles tilted with respect to the axial direction are brought into close contact with an outer surface of the cylinder member. The portions of the fiber bundles on the first end side and the portions of the fiber bundles on the second end side are then twisted at positions outside the end portions of the cylinder member and wound around the dome members. The additional reinforcing layer covering the outer surface of the reinforcing body is formed in this manner. According to this method, the additional reinforcing layer can be formed on the outer surface of the reinforcing body without rotating the reinforcing body in the circumferential direction. A structure for rotating the reinforcing body (typically, a boss to which a rotating shaft is attached) need not be provided on the opposite end of the high-pressure tank from a through hole. The axial direction and the circumferential direction of the reinforcing body are the same as the axial direction and the circumferential direction of the cylinder member, respectively.

In this case, it is preferable that at least one first tilted layer and at least one second tilted layer be formed when forming the additional reinforcing layer. The first tilted layer is a layer formed by rotating the portions of the fiber bundles on the first end side in a first direction, and the second tilted layer is a layer formed by rotating the portions of the fiber bundles on the first end side in a second direction that is opposite to the first direction. The first tilted layer is formed with the fiber bundles being tilted with respect to the axial direction under predetermined tension. Accordingly, when an expansive force is applied to the additional reinforcing layer by the gas pressure, the first tilted layer is subjected to a force in such a direction that the tilt of the fiber bundles with respect to the axial direction is eliminated. As a result, the reinforcing body is distorted. Similarly, the second tilted layer is formed with the fiber bundles being tilted in the opposite direction to the fiber bundles of the first tilted layer under predetermined tension. Accordingly, when the expansive force is applied to the additional reinforcing layer by the gas pressure, the second tilted layer is subjected to a force in such a direction that the tilt of the fiber bundles in the opposite direction to the tilt of the fiber bundles of the first tilted layer is eliminated. As a result, the reinforcing body is distorted. The fiber bundles of the first tilted layer and the fiber bundles of the second tilted layer are tilted in opposite directions. Accordingly, when the expansive force is applied to the additional reinforcing layer by the gas pressure, the force in such a direction that the tilt of the fiber bundles of the first tilted layer is eliminated and the force in such a direction that the tilt of the fiber bundles of the second tilted layer is eliminated act to cancel each other out. This reduces distortion of the fiber-reinforced resin layer and therefore restrains reduction in strength of the high-pressure tank.

In the case where the at least one tilted layer and the at least one second tilted layer are formed, it is preferable that the number of first tilted layers and the number of second tilted layers be the same. With this configuration, the force in such a direction that the tilt of the fiber bundles of the first tilted layer is eliminated and the force in such a direction that the tilt of the fiber bundles of the second tilted layer is eliminated effectively act to cancel each other out. This effectively reduces distortion of the fiber-reinforced resin layer due to the tilt of the fiber bundles and therefore effectively restrains reduction in strength of the high-pressure tank.

Liner Forming Step

In the case where the liner is formed in the above method for manufacturing the high-pressure tank, it is preferable that either or both of the two dome members be formed so as to have a through hole, a resin material be introduced into the reinforcing body through the through hole, and the liner made of the resin material be formed so as to cover an inner surface of the reinforcing body. With this configuration, the liner can be easily formed inside the reinforcing body even after the reinforcing body is formed. Moreover, no mold for molding the liner is necessary unlike the case where the liner is formed by injection molding using resin. The liner covering the inner surface of the reinforcing body may be formed either after or before the additional reinforcing layer is formed on the outer surface of the reinforcing body.

In this case, it is preferable that the liner be formed by introducing the resin material that is fluid into the reinforcing body, rotating the reinforcing body to cause the resin material to cover the inner surface of the reinforcing body, and solidifying the resin material covering the inner surface of the reinforcing body. With this configuration, as the reinforcing body is rotated, the inner surface of the reinforcing body moves upward with the fluid resin material thereon, and a part of the resin material flows down the inner surface of the reinforcing body due to its own weight. The resin material thus covers the inner surface of the reinforcing body. Accordingly, the liner covering the inner surface of the reinforcing body can be easily formed.

Before describing a method for manufacturing a high-pressure tank 10 according to an embodiment of the disclosure, the configuration of the high-pressure tank 10 will be briefly described with reference to the drawings. Although the high-pressure tank 10 is herein described as a tank that is mounted on a fuel cell vehicle and that is filled with high-pressure hydrogen gas, the high-pressure tank 10 can also be used in other applications. The gas that can be stored in the high-pressure tank 10 is not limited to high-pressure hydrogen gas.

Figure 2:
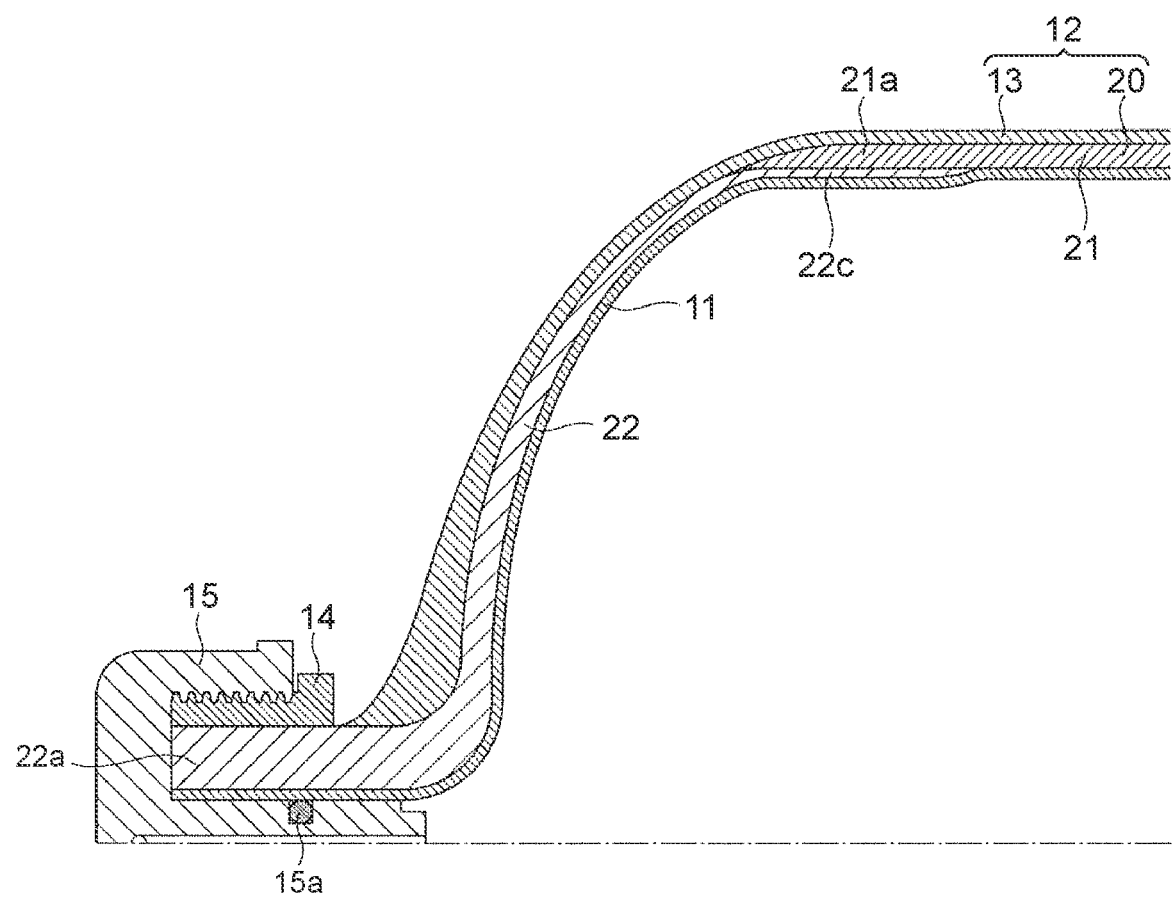
FIG. 2 is a partial sectional view illustrating the structure of a high-pressure tank that is manufactured by the method according to the embodiment of the disclosure.

As shown in FIGS. 1 and 2, the high-pressure tank 10 is a generally hollow cylindrical high-pressure gas storage container with both ends rounded in a dome shape. The high-pressure tank 10 includes a liner 11 having gas barrier properties and a fiber-reinforced resin layer 12 made of a fiber-reinforced resin and covering the outer surface of the liner 11. The fiber-reinforced resin layer 12 has a reinforcing body 20 that is a reinforcing layer and that covers the outer surface of the liner 11, and an additional reinforcing layer 13 that covers the outer surface of the reinforcing body 20. The high-pressure tank 10 has an opening in its one end and has a boss 14 attached around the opening. The high-pressure tank 10 has no opening in the other end and has no boss attached to the other end.

The liner 11 extends along the inner surface of the reinforcing body 20. The liner 11 is a resin member forming a storage space 17 that is filled with high-pressure hydrogen gas. The resin for the liner 11 is preferably a resin capable of holding filling gas (in this example, hydrogen gas) in the storage space 17, namely a resin having satisfactory gas barrier properties. Examples of such a resin include thermoplastic resins such as polyamide (PA), polyethylene (PE), ethylene-vinyl alcohol copolymer resin (EVOH), and polyester (PEs) and thermosetting resins such as epoxy (EP). Instead of hydrogen gas, the liner 11 may be filled with other fuel gases. Examples of such fuel gases include compressed gases such as compressed natural gas (CNG) and various liquefied gases such as liquefied natural gas (LNG) and liquefied petroleum gas (LPG).

The boss 14 is formed by machining a metal material such as aluminum or aluminum alloy into a predetermined shape. A valve 15 that controls the flow of hydrogen gas into and out of the storage space 17 is attached to the boss 14. The valve 15 is provided with a seal member 15a. The seal member 15a contacts the inner surface of the liner 11 in a protruding portion 22a of a dome member 22 described later and seals the storage space 17 of the high-pressure tank 10.

The reinforcing body 20 covers the outer surface of the liner 11 and has a function to reinforce the liner 11 to improve mechanical strength, such as rigidity and pressure resistance, of the high-pressure tank 10. As will be described later, the reinforcing body 20 has a hollow cylindrical cylinder member 21 and two dome members 22, 23 connected to respective end portions of the cylinder member 21. The reinforcing body 20 is a member formed by joining the cylinder member 21 and the dome members 22, 23.

The reinforcing body 20 is made of resin and fibers (continuous fibers). In the cylinder member 21, the fibers extend along the entire circumference of the cylinder member 21 at an angle substantially perpendicular to the axial direction X of the cylinder member 21. In other words, the fibers in the cylinder member 21 are oriented in the circumferential direction of the cylinder member 21. The fibers are wound at least once around the liner 11. In the cylinder member 21, the fibers are thus oriented in the circumferential direction of the cylinder member 21, and the strength of the fiber-reinforced resin layer 12 against hoop stress that is generated by an internal pressure (gas pressure) can therefore be ensured by an appropriate amount of fiber-reinforced resin. In the dome members 22, 23, on the other hand, the fibers are not oriented in the circumferential direction of the cylinder member 21 but the fibers extending in various directions crossing the circumferential direction are placed on top of one another. In the dome members 22, 23, the strength of the fiber-reinforced resin layer 12 against stress that is generated by the internal pressure (gas pressure) is therefore provided by an appropriate amount of fiber-reinforced resin.

In the embodiment, the fibers in the cylinder member 21 are not continuous with (not connected to) the fibers in the dome members 22, 23. As will be described later, the cylinder member 21 and the two dome members 22, 23 are formed separately, and the two dome members 22, 23 are then attached to respective end portions of the cylinder member 21.

The additional reinforcing layer 13 covers the outer surface of the reinforcing body 20. The additional reinforcing layer 13 covers the entire dome members 22, 23. The additional reinforcing layer 13 is made of resin and fibers (continuous fibers). In the additional reinforcing layer 13, the fibers are oriented parallel to, or obliquely at 45 degrees or less with respect to, the axial direction X of the cylinder member 21 and extend over the cylinder member 21 and across the two dome members 22, 23 located at respective ends of the cylinder member 21. These fibers suppress outward movement of the dome members 22, 23 in the axial direction X and thus suppresses coming off of the dome members 22, 23 from the cylinder member 21 outward in the axial direction X by the gas pressure.

A release material that is used to manufacture the cylinder member 21 may be present as the liner 11 in the case where the release material is a resin having gas barrier properties, or may be peeled off from the cylinder member 21 or included as it is as a release material layer (not shown) in the cylinder member 21 in the case where the release material is used only for removal from the mandrel. In the case where the release material is included as a release material layer in the cylinder member 21, the release material can serve as, for example, a resin with improved wettability such that the resin for the liner 11 can be molded uniformly in the cylinder member 21 when forming the liner 11 using rotational molding etc.

Next, the method for manufacturing the high-pressure tank 10 according to the embodiment of the disclosure will be described. FIG. 3 is a flowchart illustrating the method for manufacturing the high-pressure tank 10. As shown in FIG. 3, the method for manufacturing the high-pressure tank 10 includes a cylinder member forming step S1, a dome member forming step S2, a joining step S3, an additional reinforcing layer forming step S4, and a liner forming step S5. The cylinder member forming step S1 includes a release material winding step and a fiber-reinforced resin winding step. Since the cylinder member forming step S1 and the dome member forming step S2 are independent of each other, the steps S1, S2 may be performed either in parallel or sequentially in either order. The additional reinforcing layer forming step S4 and the liner forming step S5 are omitted in some cases.

In the cylinder member forming step S1, a release material D1 or D2 is wound around a cylindrical mandrel 200 in the release material winding step.

In a first form, as shown in FIG. 4, the sheet D1 that is a release material is wound around the cylindrical mandrel 200 by, for example, sheet winding. Specifically, the cylindrical mandrel 200 is rotated at a predetermined rotational speed by a rotation mechanism (not shown) to wind the sheet D1 that is a release material around the cylindrical mandrel 200. The sheet D1 that is a release material need only be wound in a single layer on the outer surface of the cylindrical mandrel 200. However, the sheet D1 that is a release material may be wound in a plurality of layers such as two layers, three layers, or four layers on the outer surface of the cylindrical mandrel 200. The material of the cylindrical mandrel 200 is not particularly limited, but is preferably a metal in order for the cylindrical mandrel 200 to be strong enough not to deform when the sheet D1 that is a release material is attached to the cylindrical mandrel 200.

The material of the sheet D1 that is a release material is, for example, a resin that is not altered at 100° C. to 170° C., which is the curing temperature of the fiber-reinforced resin, although the material of the sheet D1 is not particularly limited as long as the material does not adhere or bond to the cylindrical mandrel 200. Examples of such a resin include polyamide (PA), polyethylene terephthalate (PET), polytetrafluoroethylene (PTFE), epoxy (EP), and polycarbonate (PC). The thickness of a single layer of the release material D1 is not limited, but is usually about 0.05 mm or more after winding.

Figure 5:
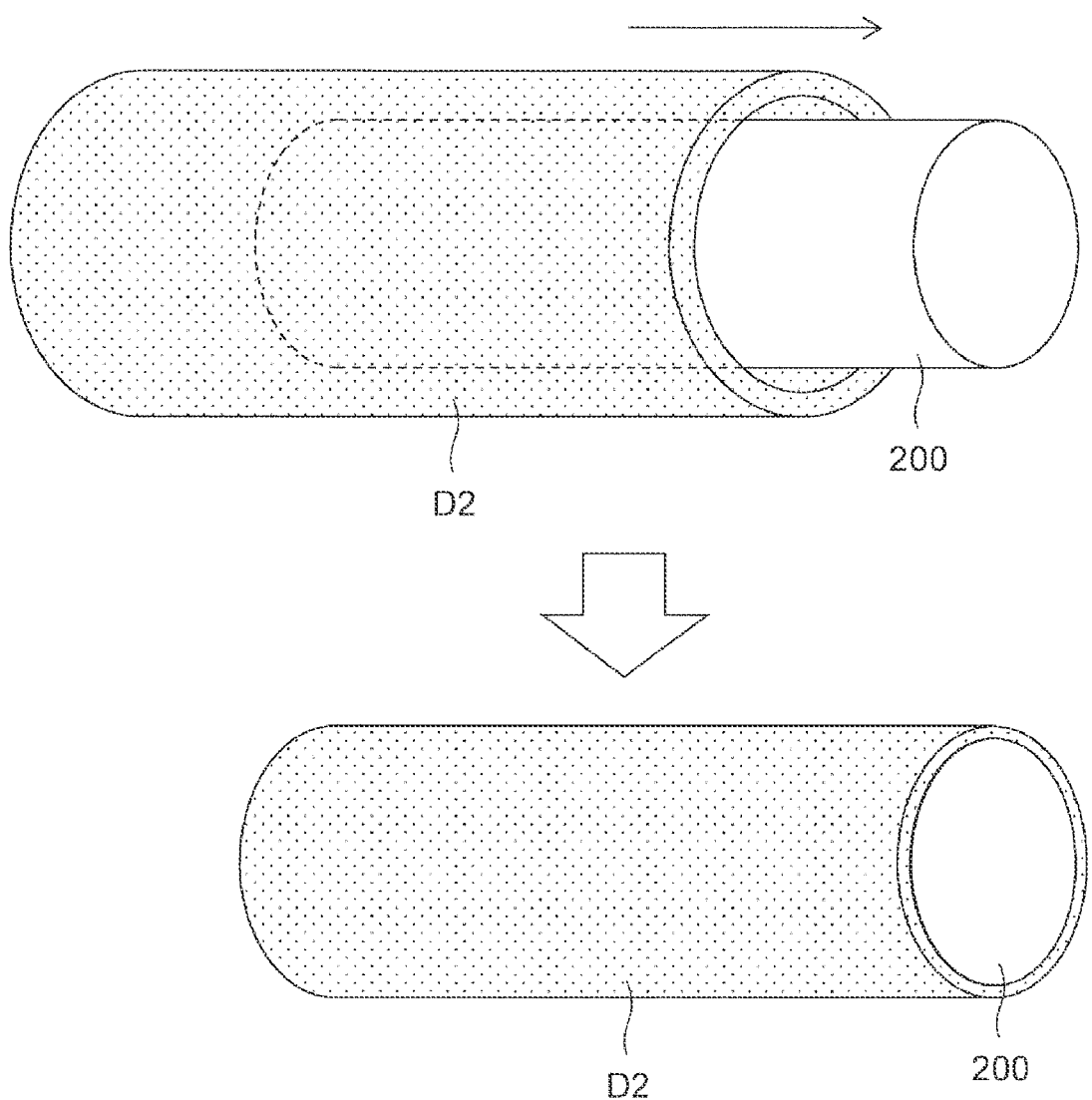
FIG. 5 is a perspective view illustrating a second form of the release material winding step in the cylinder member forming step of the method for manufacturing a high-pressure tank according to the embodiment of the disclosure.

In a second form, as shown in FIG. 5, a tubular body D2 that is a release material is inserted into the cylindrical mandrel 200. The tubular body D2 is made of a heat shrinkable material and has an inside diameter larger than the diameter of the cylindrical mandrel 200. Heat is then applied to the tubular body D2 from the outside to shrink the tubular body D2. The tubular body D2 is thus wound around the cylindrical mandrel 200.

The tubular body D2 is molded by blow molding etc. using a heat shrinkable material. The heat shrinkable material is not particularly limited, but examples of the heat shrinkable material include polyvinyl chloride (PVC), polypropylene (PP), polyethylene (PE), polystyrene (PS), and polyethylene terephthalate (PET). Heat from the outside is set to an optimal temperature based on the type of heat shrinkable material. The thickness of a single layer of the release material D2 is not limited, but is usually about 0.05 mm or more after winding.

In the cylinder member forming step S1, the release material D1 or D2 is preferably made of a resin having gas barrier properties. The resin having gas barrier properties is not particularly limited, but examples of the resin having gas barrier properties include thermoplastic resins such as polyamide (PA), polyethylene (PE), ethylene-vinyl alcohol copolymer resin (EVOH), and polyester (PEs) and thermosetting resins such as epoxy (EP). The resin having gas barrier properties has, for example, a multilayer structure with an ethylene-vinyl alcohol copolymer resin interposed between poly amide or polyethylene. In the case where the resin having gas barrier properties is used as the release material D1 or D2, the release material D1 or D2 can serve as a part of the liner 11 in the high-pressure tank 10. In this case, as described later, the resin having gas barrier properties is placed on the inner surfaces of the two dome members 22, 23. In a third step, the reinforcing body 20 that is a reinforcing layer is formed by joining both end portions of the cylinder member 21 and the end portions of the two dome members 22, 23. When forming the reinforcing body 20 in the third step, the liner 11 is formed by joining, by, for example, welding, the end portions of the release material D1 or D2 included in the cylinder member 21 and the end portions of the resin having gas barrier properties placed on the inner surfaces of the dome members 22, 23. The liner forming step S5 can therefore be omitted. In the case where the sheet D1 having gas barrier properties, which is a release material, is wound around the cylindrical mandrel 200, the end portions of the sheet D1 come into contact with each other or overlap each other as shown in FIG. 6 and form a joint portion (welding portion). However, in the case where the tubular body D2 that not only is heat shrinkable but also has gas barrier properties is used as a release material, the cylinder member 21 having no welding portion is implemented, which further improves the gas barrier properties of the high-pressure tank 10 and suppresses leakage of gas such as hydrogen. An inspection process of checking for joining failure can therefore be omitted.

Subsequently, for example, as shown in FIG. 7, a fiber bundle F impregnated with a resin, which is a fiber-reinforced resin, is wound on the release material by a filament winding process (FW process) in the fiber-reinforced resin winding step. Specifically, the cylindrical mandrel 200 having the release material D1 or D2 on its outer surface is rotated to wind the fiber bundle F such that the fiber bundle F covers the outer surface of the cylindrical mandrel 200. In this case, it is preferable to wind the fiber bundle F such that the fibers are oriented in the circumferential direction of the cylindrical mandrel 200.

The resin with which the fiber bundle F is impregnated is not particularly limited, but is, for example, a thermosetting resin. Preferred examples of the thermosetting resin include a phenol resin, a melamine resin, a urea resin, and an epoxy resin, and an epoxy resin is particularly preferable in terms of mechanical strength etc. Epoxy resins are typically resins produced by mixing a prepolymer such as bisphenol A-epichlorohydrin copolymer and a curing agent such as polyamine and thermally curing the mixture. Epoxy resins are fluid when uncured and form a strong crosslinked structure when thermally cured. The resin with which the fiber bundle F is impregnated may be a thermoplastic resin. Examples of the thermoplastic resin include polyether ether ketone, polyphenylene sulfide, polyacrylic acid ester, polyimide, and polyamide.

Examples of the fibers in the fiber bundle F include glass fibers, aramid fibers, boron fibers, and carbon fibers. Carbon fibers are particularly preferable in terms of lightweightness, mechanical strength, etc.

In the example described above, the reinforcing layer is formed by the FW process. However, the cylinder member 21 may be formed by other methods. For example, the reinforcing layer may be formed by a sheet winding process using a fiber sheet.

The fiber sheet preferably includes at least fibers oriented in the circumferential direction of the cylindrical mandrel 200. The cylinder member 21 having fibers oriented in the circumferential direction is thus obtained. The size of the fiber sheet is not limited, but for example, the length of the fiber sheet may be equal to the length in the axial direction X of the cylinder member.

Examples of the fiber sheet include what is called a uni-direction (UD) sheet formed by interlacing a plurality of fiber bundles aligned in a single direction with restraining yarn, and a fiber sheet formed by interlacing a plurality of fiber bundles aligned in a single direction with a plurality of fiber bundles crossing these fiber bundles, for example, oriented perpendicularly to these fiber bundles.

The fiber sheet is preferably a fiber sheet pre-impregnated with a resin. The resin with which the fiber sheet is impregnated is not particularly limited, but is, for example, a thermosetting resin. Like the fiber bundle F, preferred examples of the thermosetting resin include a phenol resin, a melamine resin, a urea resin, and an epoxy resin, and an epoxy resin is particularly preferable in terms of mechanical strength etc.

Like the fiber bundle F, examples of the fibers in the fiber sheet include glass fibers, aramid fibers, boron fibers, and carbon fibers, and carbon fibers are particularly preferable in terms of lightweightness, mechanical strength, etc.

As shown in FIG. 8, both end portions in the axial direction X of the cylinder member 21 formed on the outer surface of the cylindrical mandrel 200 become gradually thinner towards the edges in the axial direction X of the cylinder member 21. As shown in FIG. 2, steps are therefore less likely to be formed at the joint portion between the outer surface of the cylinder member 21 and the outer surfaces of the two dome members 22, 23 when the cylinder member 21 is combined with the two dome members 22, 23. This reduces formation of voids between the additional reinforcing layer 13 and the reinforcing body 20 due to the steps at the joint portion between the cylinder member 21 and the two dome members 22, 23.

In order to make both end portions in the axial direction X of the cylinder member 21 gradually thinner toward the edges in the axial direction X of the cylinder member 21, it is preferable that the number of windings of the fiber bundle F be adjusted or that the fiber bundles in the end portions in the axial direction X (lateral direction) of the fiber sheet be interlaced such that the thickness of the fiber bundles becomes gradually smaller toward the edges in the axial direction X of the fiber sheet. Both end portions in the axial direction X of the cylinder member 21 may be made gradually thinner toward the edges in the axial direction X of the cylinder member 21 by pressing both end portions in the axial direction X of the cylinder member 21 by rollers etc.

Thereafter, the cylinder member 21 is removed from the outer surface of the cylindrical mandrel 200. Since the cylinder member 21 includes the release material D1 or D2 at its contact surface with the cylindrical mandrel 200, the cylinder member 21 can be easily removed from the cylindrical mandrel 200. It is preferable to solidify the cylinder member 21 before removing the cylinder member 21 from the outer surface of the cylindrical mandrel 200. Solidifying the cylinder member 21 reduces deformation of the cylinder member 21 when removing from the cylindrical mandrel 200.

The process of solidifying the cylinder member 21 is not particularly limited. However, for example, in the case where the resin of the cylinder member 21 (that is, the fiber bundle F) is a thermosetting resin, the resin may be precured. Precuring conditions (temperature and time), which vary depending on the type of resin of the cylinder member 21, are set such that the viscosity of the precured resin in the fiber bundle F is higher than the viscosity of the resin in the fiber bundle F when wound around the cylindrical mandrel 200 (the viscosity before precuring of the resin in the fiber bundle F). In this example, the fiber bundle F is precured until the resin in the fiber bundle F is no longer fluid.

The viscosity of the resin of the cylinder member 21 when removing from the cylindrical mandrel 200 is preferably 0.05 Pa·s to 100 Pa·s. With the viscosity being 0.05 Pa·s or higher, the deformation of the cylinder member 21 when removing from the cylindrical mandrel 200 is sufficiently reduced. With the viscosity being 100 Pa·s or lower, a large part of the resin of the cylinder member 21 remains uncured. The presence of this uncured part restrains reduction in adhesive strength between the cylinder member 21 and the two dome members 22, 23 when curing the cylinder member 21 and the two dome members 22, 23 in a later step. Moreover, since the heating time of the resin is reduced, the manufacturing time of the cylinder member 21 is reduced. The precuring conditions include heating for 10 to 120 minutes at temperatures higher than the gelation temperature of the resin with which the fiber bundle F is impregnated. For example, in the case where the fiber bundle F is impregnated with an epoxy resin, the precuring conditions may be 100° C. to 170° C. and 10 to 120 minutes.

The higher the viscosity of the resin of the cylinder member 21 is, the more the deformation of the cylinder member 21 when removing from the cylindrical mandrel 200 is reduced. The resin of the cylinder member 21 may be cured completely (e.g., until physical properties such as Young's modulus become stable) (complete curing). In this case, however, the manufacturing time of the cylinder member 21 is increased. It is therefore desirable to stop heating and allow to cool as soon as the resin of the cylinder member 21 reaches such a viscosity that the cylinder member 21 can be easily removed from the cylindrical mandrel 200 (e.g., 0.05 Pa·s) or higher.

In the case where the resin of the cylinder member 21 is a thermoplastic resin, the cylinder member 21 may be solidified by cooling the cylinder member 21 when the resin is fluid. In this case as well, the deformation of the cylinder member 21 when removing from the cylindrical mandrel 200 is reduced.

It is not essential to solidify the cylinder member 21. Since the cylinder member 21 includes the release material D1 or D2 at its contact surface with the cylindrical mandrel 200, the cylinder member 21 can be easily removed from the cylindrical mandrel 200. Accordingly, even in the case where the cylinder member 21 is not solidified, that is, even in the case where the cylinder member 21 is sticky, the cylinder member 21 can be easily removed from the cylindrical mandrel 200 without applying a release agent to the outer surface of the cylindrical mandrel 200. Alternatively, the cylindrical mandrel 200 may be comprised of a plurality of members that can be separated in the radial direction, and the cylindrical mandrel 200 may be removed from the cylinder member 21 little by little (one member by one member).

The cylinder member 21 removed from the cylindrical mandrel 200 includes the release material D1 or D2. Depending on the design concept and method, etc., any of the following can be selected: the release material D1 or D2 included in the cylinder member is peeled off from a fiber-reinforced resin layer; when, for example, the resin having gas barrier properties is used as the release material D1 or D2, the release material D1 or D2 is fixed, as a part of the liner 11, to the fiber-reinforced resin layer; and the release material D1 or D2 is fixed, as a resin with improved wettability, to the fiber-reinforced resin layer such that the resin for the liner 11 can be molded uniformly in the cylinder member 21 when forming the liner 11 using rotational molding etc.

Figure 9:
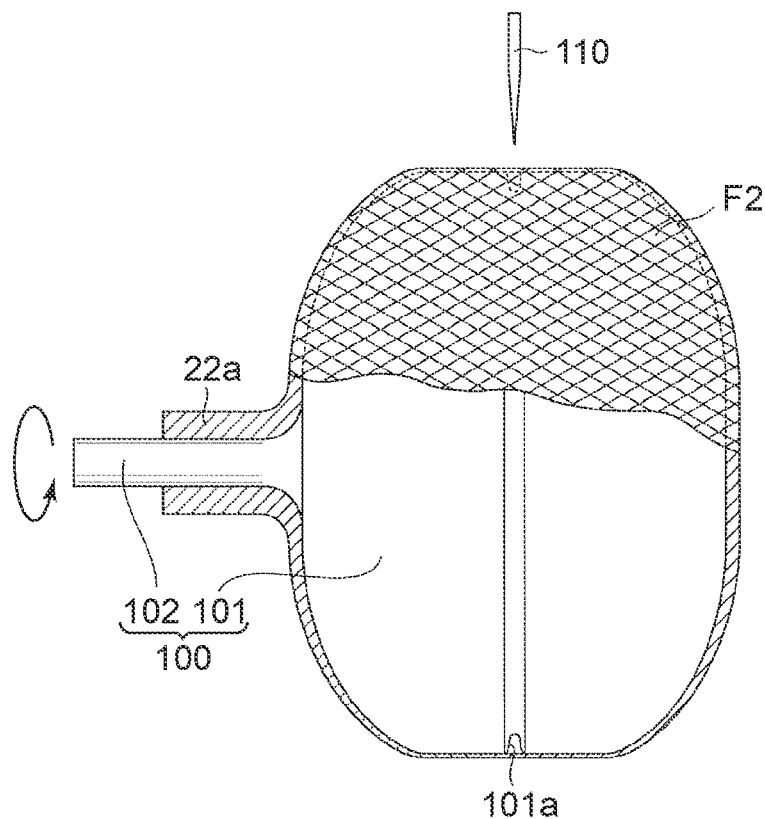
FIG. 9 is a partial sectional view illustrating a dome member forming step of the method for manufacturing a high-pressure tank according to the embodiment of the disclosure.
Figure 10:
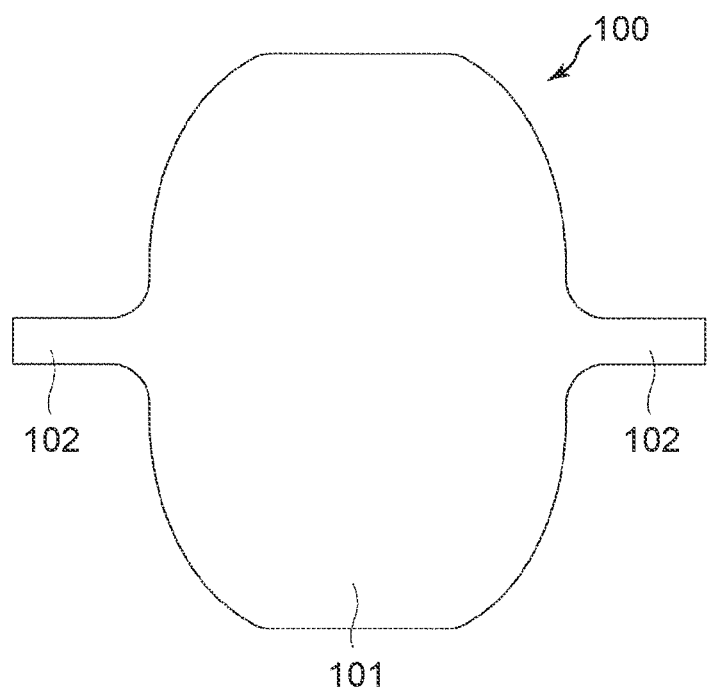
FIG. 10 is a sectional view illustrating one form of a mandrel in the dome member forming step of the method for manufacturing a high-pressure tank according to the embodiment of the disclosure.

In the dome member forming step S2, as shown in FIG. 9, a fiber bundle F2 impregnated with a resin, which is a fiber-reinforced resin, is wound around a mandrel (predetermined die) 100 by, for example, a filament winding process (FW process). Specifically, the mandrel 100 has a body 101 and a shaft portion 102 extending outward from one end of the body 101. The body 101 has a circular shape as viewed in the axial direction of the shaft portion 102. The body 101 has a groove 101a in the middle in the axial direction. The groove 101a is formed in the outer peripheral surface of the body 101 and extends along the entire circumference of the body 101. The shaft portion 102 is rotatably supported by a rotation mechanism (not shown). The mandrel 100 shown in FIG. 9 includes a single shaft portion 102. As shown in FIG. 10, however, depending on a desired gas tank, the mandrel 100 may include the shaft portion 102 above and another shaft portion 102 located on the opposite side from the shaft portion 102, namely located 180° from the shaft portion 102.

The mandrel 100 is rotated to wind the fiber bundle F2 such that the fiber bundle F2 covers the outer surface of the mandrel 100. At this time, the fiber bundle F2 is also wound around the shaft portion 102 to form the hollow cylindrical protruding portion 22a with a through hole 22b (see FIG. 11). The fiber bundle F2 is wound at, for example, 40 degrees with respect to the axial direction of the shaft portion 102. The material of the mandrel 100 is not particularly limited, but is preferably metal in order for the mandrel 100 to be strong enough not to deform when the fiber bundle F2 is wound around the mandrel 100.

Like the fiber bundle F, the resin with which the fiber bundle F2 is impregnated is not particularly limited, but is, for example, a thermosetting resin. Preferred examples of the thermosetting resin include a phenol resin, a melamine resin, a urea resin, and an epoxy resin, and an epoxy resin is particularly preferable in terms of mechanical strength etc. Epoxy resins are typically resins produced by mixing a prepolymer such as bisphenol A-epichlorohydrin copolymer and a curing agent such as polyamine and thermally curing the mixture. Epoxy resins are fluid when uncured and form a strong crosslinked structure when thermally cured. The resin with which the fiber bundle F2 is impregnated may be a thermoplastic resin. Examples of the thermoplastic resin include polyether ether ketone, polyphenylene sulfide, polyacrylic acid ester, polyimide, and polyamide.

Like the fiber bundle F, examples of fibers in the fiber bundle F2 include glass fibers, aramid fibers, boron fibers, and carbon fibers. Carbon fibers are particularly preferable in terms of lightweightness, mechanical strength, etc.

Figure 11:
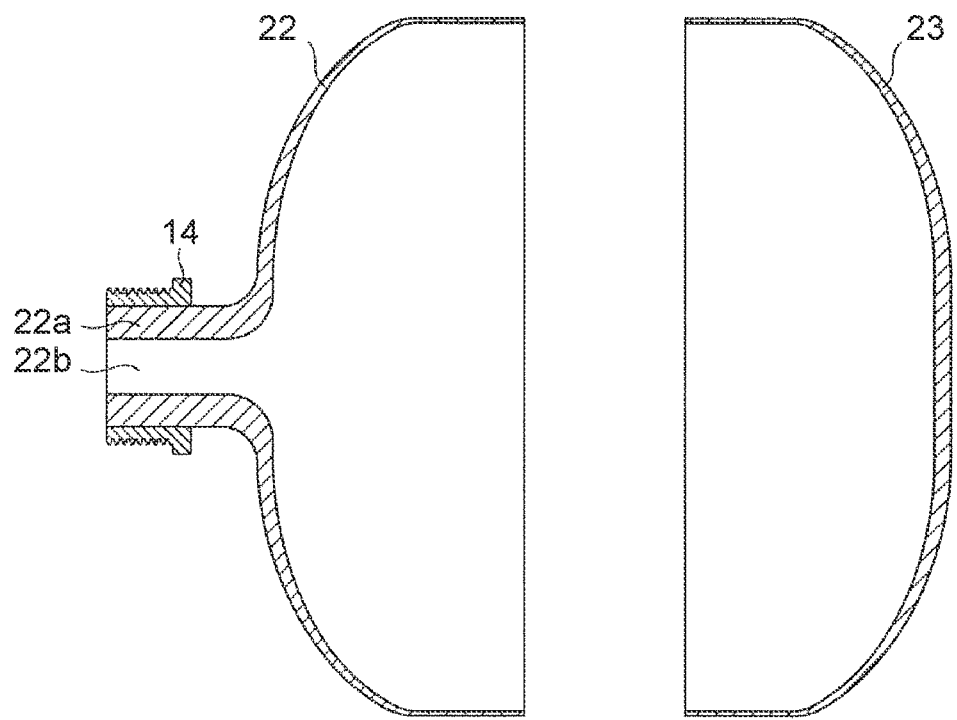
FIG. 11 is a sectional view illustrating the dome member forming step of the method for manufacturing a high-pressure tank according to the embodiment of the disclosure.

Next, the resultant winding body (fiber bundle F2) wound on the outer surface of the mandrel 100 is cut into two parts using a cutter 110 (see FIG. 9). As shown in FIG. 11, the two parts are then removed from the mandrel 100. The two dome members 22, 23 are formed in this manner.

Specifically, in the state shown in FIG. 9, the boss 14 is attached to the outer surface of the protruding portion 22a. The resin in the winding body (fiber bundle F2) is then solidified, and a blade of the cutter 110 is inserted into the groove 101a of the mandrel 100 while rotating the mandrel 100. The winding body is thus cut into two parts, and the two parts of the resin of the wing body (fiber bundle F2) are then removed from the mandrel 100. The two dome members 22, 23 are formed in this manner. The cutter 110 is not particularly limited, but may be, for example, a rotating disk with a blade along its outer peripheral surface, a thin plate with a blade along its side surface, or a cutter that cuts the fiber bundle F2 using a laser beam.

Solidifying the resin in the fiber bundle F2 reduces deformation of the fiber bundle F2 when cutting with the cutter 110 and reduces deformation of the two dome members 22, 23 when removing from the mandrel 100.

The process of solidifying the resin in the fiber bundle F2 is not particularly limited. However, like the fiber bundle F in the cylinder member forming step S1, in the case where the resin in the fiber bundle F2 (that is, the resin of the two dome members 22, 23) is, for example, a thermosetting resin, the resin may be precured. Precuring conditions (temperature and time), which vary depending on the type of resin in the fiber bundle F2, are set such that the viscosity of the precured resin in the fiber bundle F2 is higher than the viscosity of the resin in the fiber bundle F2 when wound around the mandrel 100 (the viscosity before precuring of the resin in the fiber bundle F2). In this example, the fiber bundle F2 is precured until the resin in the fiber bundle F2 is no longer fluid.

The viscosity of the resin in the fiber bundle F2 when cutting with the cutter 110 and when removing from the mandrel 100 is preferably 0.05 Pa·s to 100 Pa·s. With the viscosity being 0.05 Pa·s or higher, the deformation of the fiber bundle F2 when cutting with the cutter 110 and when removing from the mandrel 100 is sufficiently reduced. With the viscosity being 100 Pa·s or lower, a large part of the resin in the fiber bundle F2 remains uncured. The presence of this uncured part restrains reduction in adhesive strength between the cylinder member 21 and the two dome members 22, 23 when curing the cylinder member 21 and the two dome members 22, 23 in a later step. Moreover, since the heating time of the resin is reduced, the manufacturing time of the dome members 22, 23 is reduced. The precuring conditions include heating for 10 to 120 minutes at temperatures higher than the gelation temperature of the resin with which the fiber bundle F2 is impregnated. For example, in the case where the fiber bundle F2 is impregnated with an epoxy resin, the precuring conditions may be 100° C. to 170° C. and 10 to 120 minutes.

The higher the viscosity of the resin in the fiber bundle F2 is, the more the deformation of the fiber bundle F2 when cutting with the cutter 110 is reduced and the more the deformation of the two dome members 22, 23 when removing from the mandrel 100 is reduced. The resin in the fiber bundle F2 may be cured completely (e.g., until physical properties such as Young's modulus become stable) (complete curing). In this case, however, the manufacturing time of the dome members 22, 23 is increased. It is therefore desirable to stop heating and allow to cool as soon as the resin in the fiber bundle F2 reaches such a viscosity that the dome members 22, 23 can be easily removed from the mandrel 100 (e.g., 0.05 Pa·s) or higher. "Thermal curing" in the specification and the claims represents a concept including precuring and complete curing.

In the case where the resin in the fiber bundle F2 is a thermoplastic resin, the resin in the fiber bundle F2 may be solidified by cooling the fiber bundle F2 when the resin is fluid. In this case as well, the deformation of the fiber bundle F2 when cutting with the cutter 110 is reduced, and the deformation of the fiber bundle F2 when removing the two dome members 22, 23 from the mandrel 100 is also reduced.

In the example described above, the fiber bundle F2 is cut with the cutter 110 after solidifying the resin in the fiber bundle F2. However, the fiber bundle F2 may be cut with the cutter 110 without solidifying the resin in the fiber bundle F2. In this case, the resin in the fiber bundle F2 may be solidified after cutting the fiber bundle F2 with the cutter 110.

It is not essential to solidify the resin in the fiber bundle F2. However, in the case where the resin in the fiber bundle F2 is not solidified, the resin is sticky, and it is difficult to remove the fiber bundle F2 from the mandrel 100 (the fiber bundle F2 tends to deform). It is therefore preferable to, for example, apply a release agent to the surface of the mandrel 100 before winding the fiber bundle F2 around the mandrel 100 or remove the two dome members 22, 23 from the mandrel 100 at a reduced pulling speed in order to reduce the deformation of the fiber bundle F2.

In the example described above, the boss 14 is attached to the outer surface of the protruding portion 22a after the fiber bundle F2 is wound around the mandrel 100. However, a boss may be attached in advance to the joint portion between the body 101 and the shaft portion 102 of the mandrel 100, and the fiber bundle F2 may be wound around the mandrel 100 with the boss attached to the joint portion. In this case, a part of the boss is covered with and held by the fiber bundle F2. The boss can thus be firmly fixed by the fiber bundle F2.

In the case where the resin having gas barrier properties is used as the release material D1 or D2 for the cylinder member 21 in the cylinder member forming step S1, the resin having gas barrier properties is placed on the inner surfaces of the two dome members 22, 23. In this case, in the joining step S3, the liner 11 can be formed by joining, by, for example, welding, the release material in the cylinder member 21 and the resin having gas barrier properties placed on the inner surfaces of the dome members 22, 23.

As described above, in the cylinder member forming step S1, the cylinder member 21 made of a fiber-reinforced resin and having fibers oriented in the circumferential direction is formed using the cylindrical mandrel 200. Since the fibers in the cylinder member 21 are oriented in the circumferential direction, the strength of the fiber-reinforced resin layer 12 against the hoop stress that is generated by the gas pressure can be secured by an appropriate amount of fiber-reinforced resin. In the dome member forming step S2, the two dome members 22, 23 are formed using the mandrel 100. The dome members 22, 23 are thus formed separately from the cylinder member 21 by using an appropriate amount of fiber-reinforced resin. The usage of the fiber-reinforced resin for the cylinder member 21 is therefore not increased due to formation of the dome members 22, 23.

The dome members 22, 23 are formed using the mandrel 100, and the cylinder member 21 is formed using the cylindrical mandrel 200. Accordingly, the cylinder member 21 and the dome members 22, 23 are formed without directly winding the fiber bundle etc. around the liner 11. Since the liner 11 is not subjected to a tightening force due to hoop winding, helical winding, etc., it is not necessary to increase the strength of the liner 11 such that the liner 11 does not deform due to the tightening force. Moreover, in the case where the release material D1 or D2 serves as the liner 11, the liner 11 is supported by the cylindrical mandrel 200 when forming the cylinder member 21, namely when winding the fiber bundle around the liner 11. Accordingly, even when the liner 11 is subjected to the tightening force due to hoop winding, helical winding, etc., the liner 11 will not deform due to the tightening force, and the strength of the liner 11 therefore need not be increased. The thickness (wall thickness) of the liner 11 can therefore be reduced. Accordingly, the capacity of the liner 11 can be increased and the weight of the liner 11 can be reduced.

Reducing the thickness of the liner 11 also has the following effects. For example, when gas is continuously used at pressures close to the lower limit gas pressure (the lower limit of the normal use range) of the high-pressure tank 10, the liner 11 may thermally shrink due to decreases in temperature and internal pressure caused by adiabatic expansion. However, by reducing the thickness of the liner 11, the liner 11 more easily expands due to the internal pressure, and thermal shrinkage of the liner 11 is therefore reduced. Accordingly, the lower limit gas pressure can be set to a lower value, and a larger amount of gas can be discharged from the high-pressure tank 10.

Figure 12:
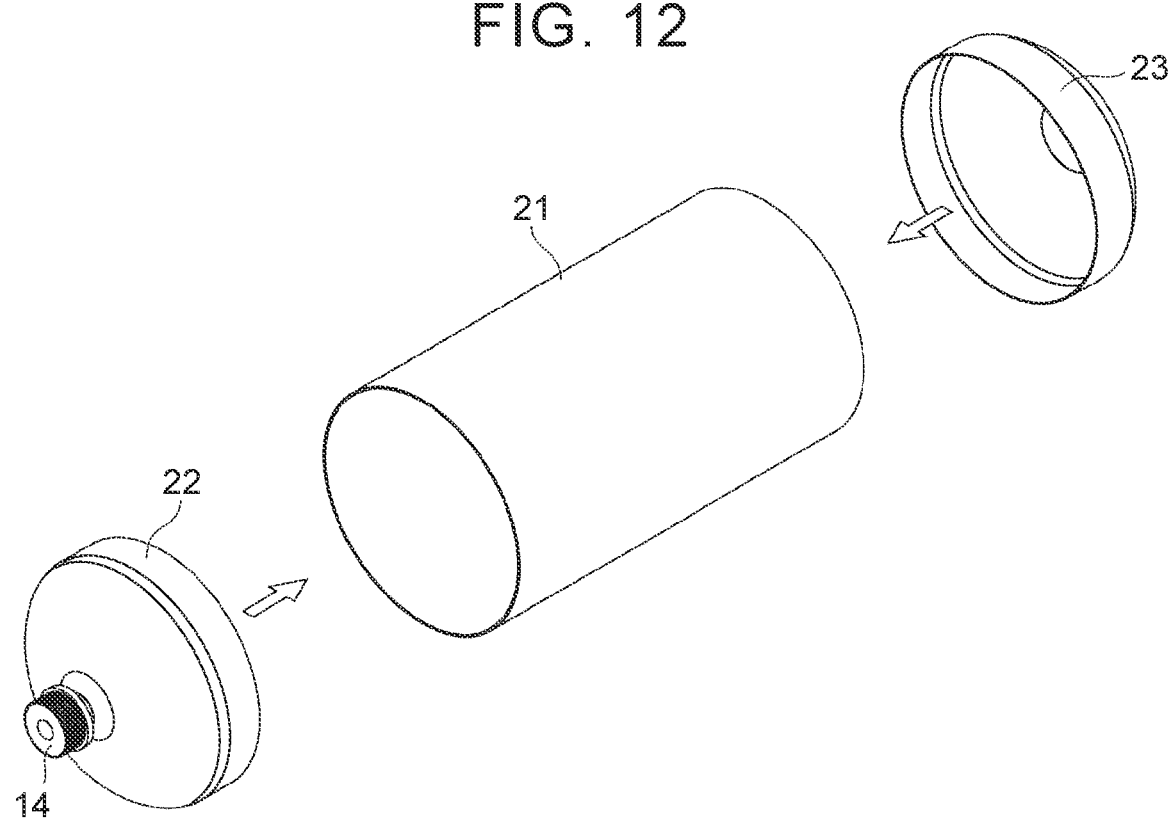
FIG. 12 is a perspective view illustrating a joining step of the method for manufacturing a high-pressure tank according to the embodiment of the disclosure.
Figure 13:
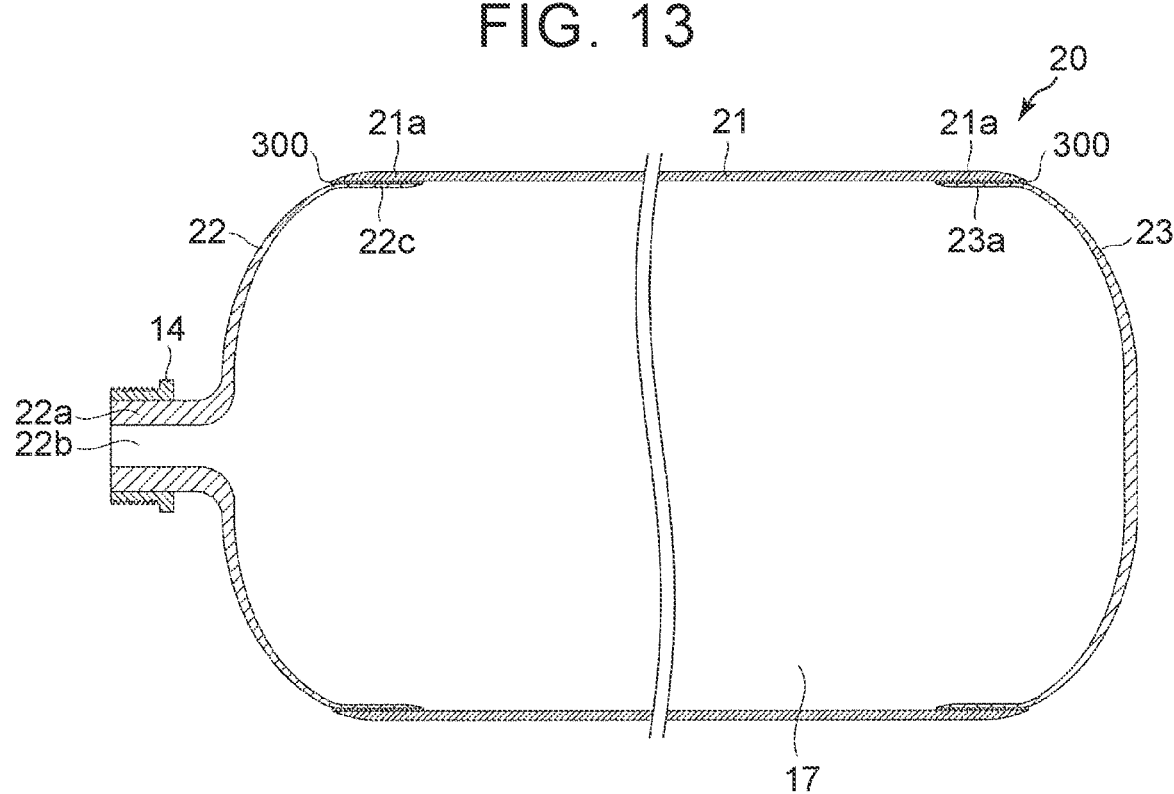
FIG. 13 is a sectional view illustrating the joining step of the method for manufacturing a high-pressure tank according to the embodiment of the disclosure.

In the joining step S3, as shown in FIGS. 12 and 13, both end portions 21a of the cylinder member 21 and end portions 22c, 23a of the two dome members 22, 23 are joined to form the reinforcing body 20 that is a reinforcing layer.

Specifically, the end portion 22c of the dome member 22 and the end portion 23a of the dome member 23 are fitted in the end portions 21a of the cylinder member 21. Since the end portions 21a of the cylinder member 21, the end portion 22c of the dome member 22, and the end portion 23a of the dome member 23 have a cylindrical shape, the end portion 22c of the dome member 22 and the end portion 23a of the dome member 23 contact the end portions 21a of the cylinder member 21 along the entire circumference. An adhesive 300 (see FIG. 13) may be applied between the cylinder member 21 and the dome members 22, 23. This configuration further restrains the dome members 22, 23 from coming off from the cylinder member 21 in a later step. Moreover, since the adhesive 300 fills the gaps between the cylinder member 21 and the dome members 22, 23, flowing of a resin material for the liner 11 into the gaps between the cylinder member 21 and the dome members 22, 23 can be suppressed in the liner forming step S5. The material of the adhesive 300 is not particularly limited, but is preferably, for example, a thermosetting resin such as epoxy resin. The adhesive 300 may be a resin having the same composition as the cylinder member 21 or the dome members 22, 23. Even when the adhesive 300 is not used, the resin contained in the additional reinforcing layer 13 oozes from the additional reinforcing layer 13 and fills the gaps between the cylinder member 21 and the dome members 22, 23 during curing in the additional reinforcing layer forming step S4. The resin material for the liner 11 is therefore restrained from flowing into the gaps between the cylinder member 21 and the dome members 22, 23 in the liner forming step S5.

It is preferable that the dome members 22, 23 when fitting of the dome members 22, 23 and the cylinder member 21 together be thermally cured (precured or completely cured) in advance. The strength of the dome members 22, 23 is thus increased in advance by the thermal curing. Accordingly, when fitting the dome members 22, 23 and the cylinder member 21 together, the end portions 21a of the cylinder member 21 conform to the end portions 22c, 23a of the dome members 22, 23. Since the dome members 22, 23 function as guide portions, the cylinder member 21 and the dome members 22, 23 can thus be easily fitted together. In the case where the cylinder member 21 that is disposed outward of the dome members 22, 23 is not thermally cured in advance, the cylinder member 21 may deform when fitting the cylinder member 21 and the dome members 22, 23 together. However, even when such deformation of the cylinder member 21 occurs, the outer shape of the cylinder member 21 can be adjusted or the cylinder member 21 can be brought into close contact with the dome members 22, 23 as shown in FIG. 13, because the cylinder member 21 can be pressed from the outside. The boss 14 is attached to the dome member 22 in advance, and the reinforcing body 20 and the additional reinforcing layer 13 will be supported by the boss 14 in a later step. It is therefore preferable that the dome member 22 have increased strength such that the dome member 22 can support the boss 14, the reinforcing body 20, and the additional reinforcing layer 13. Accordingly, it is effective to thermally cure the dome member 22 in advance.

In the case where the resin having gas barrier properties is used as the release material D1 or D2 for the cylinder member 21 in the cylinder member forming step S1, the resin having gas barrier properties is placed on the inner surfaces of the two dome members 22, 23. The liner 11 can be formed by joining the release material in the cylinder member 21 and the resin having gas barrier properties placed on the inner surfaces of the two dome members 22, 23 by, for example, welding or by using, for example, an adhesive. In this case, the liner forming step S5 can be omitted.

Figure 14:
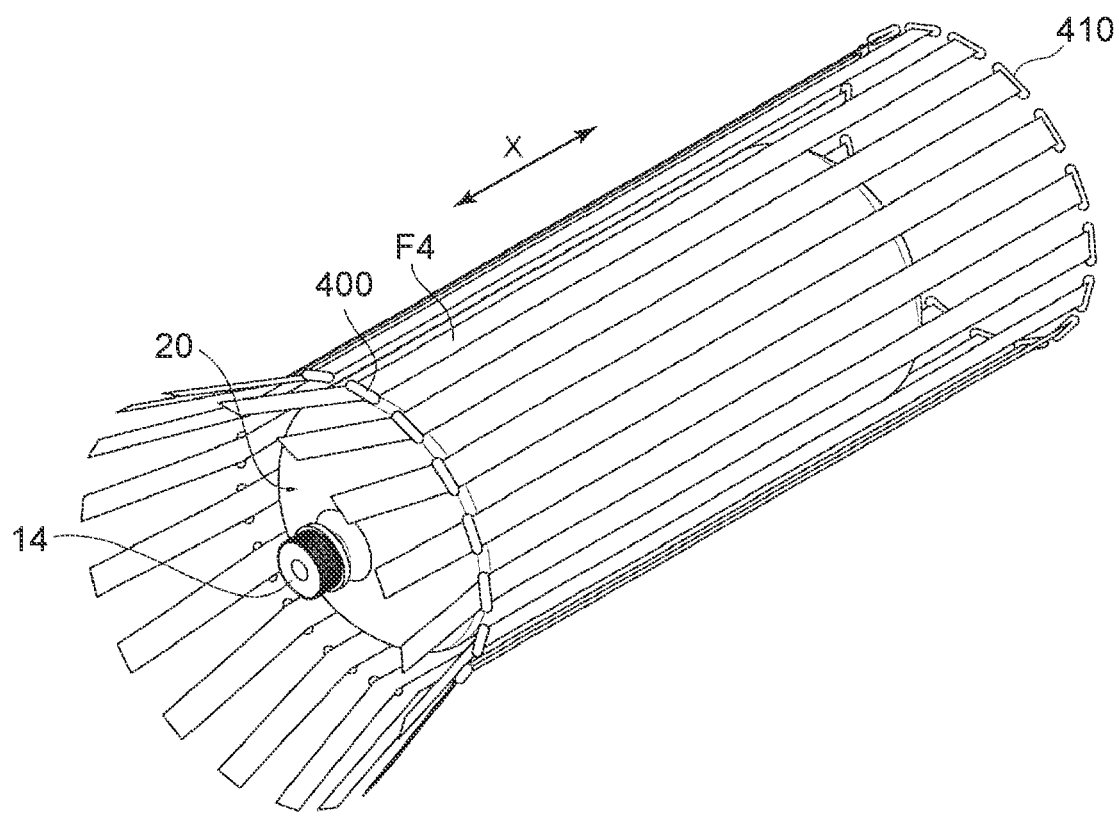
FIG. 14 is a perspective view illustrating an additional reinforcing layer forming step of the method for manufacturing a high-pressure tank according to the embodiment of the disclosure.
Figure 15:
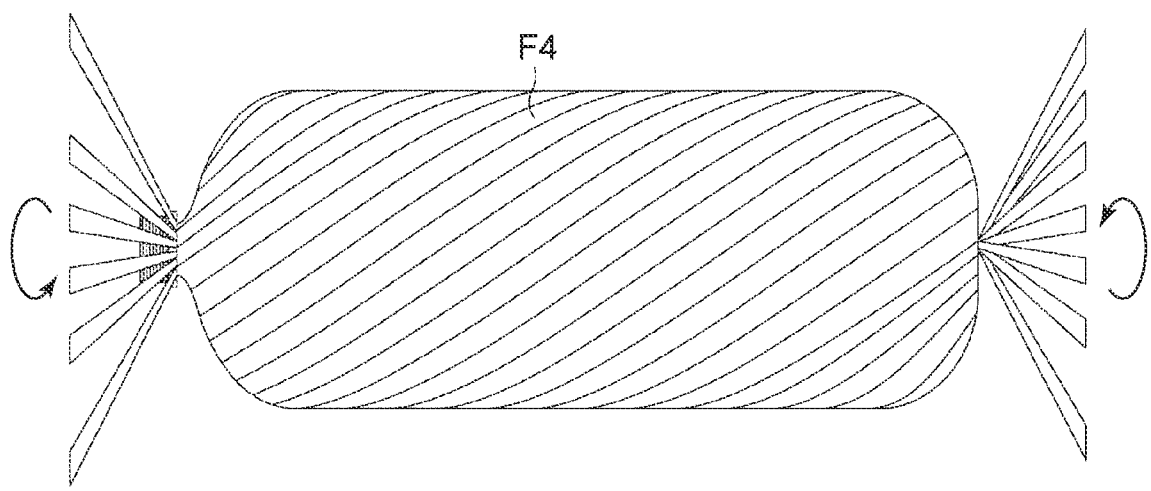
FIG. 15 is a perspective view illustrating the additional reinforcing layer forming step of the method for manufacturing a high-pressure tank according to the embodiment of the disclosure.

In the additional reinforcing layer forming step S4 that is performed in some cases, the additional reinforcing layer 13 made of a fiber-reinforced resin and having fibers placed across the two dome members 22, 23 is formed so as to cover the outer surface of the reinforcing body 20. The fiber-reinforced resin layer 12 having the reinforcing body 20 and the additional reinforcing layer 13 is formed in this manner. The additional reinforcing layer 13 can be formed by, for example, a method shown in FIGS. 14 and 15. Specifically, a support mechanism (not shown) is attached to the boss 14 mounted on the reinforcing body 20 such that the support mechanism holds the reinforcing body 20. Although FIGS. 14 and 15 illustrate the reinforcing body 20 placed horizontally, the reinforcing body 20 may be placed vertically in order to suppress bending of the reinforcing body 20 downward under gravity.

A plurality of resin-impregnated fiber bundles F4 is then placed over the reinforcing body 20 such that the fiber bundles F4 extend in the axial direction X of the reinforcing body 20 at predetermined angular intervals in the circumferential direction of the reinforcing body 20 and at a predetermined distance from the outer surface of the reinforcing body 20. At this time, the fiber bundles F4 are fed through a plurality of feed parts 400 of a feed device, and the tip ends of the fiber bundles F4 are held by a plurality of holding members 410.

The resin with which the fiber bundles F4 are impregnated is not particularly limited, but is, for example, a thermosetting resin. Like the fiber bundle F, preferred examples of the thermosetting resin include a phenol resin, a melamine resin, a urea resin, and an epoxy resin, and an epoxy resin is particularly preferable in terms of mechanical strength etc.

Like the fiber bundle F, examples of fibers in the fiber bundles F4 include glass fibers, aramid fibers, boron fibers, and carbon fibers, and carbon fibers are particularly preferable in terms of lightweightness, mechanical strength, etc.

Thereafter, in the state shown in FIG. 14, the feed parts 400 and the holding members 410 are rotated in opposite directions in the circumferential direction of the reinforcing body 20. The portions of the fiber bundles F4 on a first end side (feed part 400 side) and the portions of the fiber bundles F4 on a second end side (holding member 410 side) are thus rotated relative to each other in the circumferential direction of the reinforcing body 20. In this example, the portions of the fiber bundles F4 on the first end side are rotated in a first direction, and the portions of the fiber bundles F4 on the second end side are rotated in a second direction opposite to the first direction. As a result, as shown in FIG. 15, the fiber bundles F4 are tilted with respect to the axial direction X of the cylinder member 21, and the gaps between the fiber bundles F4 are eliminated and the fiber bundles F4 partially overlap each other. The fiber bundles F4 gradually approach the outer surface of the reinforcing body 20 and are eventually placed onto the outer surface of the reinforcing body 20 with no gap between the fiber bundles F4. At this time, the fiber bundles F4 tilted with respect to the axial direction X are brought into close contact with the outer surface of the cylinder member 21, and movement of those portions of the fiber bundles F4 which are in close contact with the outer surface of the cylinder member 21 is restricted due to the adhesive force of the resin. The portions of the fiber bundles F4 on the first end side and the portions of the fiber bundles F4 on the second end side are then twisted by the feed parts 400 and the holding members 410 at the positions outside the end portions of the cylinder member 21, and are thus wound around the dome members 22, 23. In this manner, the additional reinforcing layer 13 is formed so as to cover the outer surface of the reinforcing body 20. Thereafter, unnecessary portions of the fiber bundles F4 are cut off. The first layer of the fiber bundles F4 is thus formed.

The fiber bundles F4 are provided to suppress coming off of the dome members 22, 23 from the cylinder member 21 outward in the axial direction X by the gas pressure. The fiber bundles F4 are therefore placed in the axial direction X of the cylinder member 21. The tilt angle of the fiber bundles F4 (the angle of the fiber bundles F4 with respect to the axial direction X of the cylinder member 21) is not particularly limited, but the fiber bundles F4 are oriented preferably at an angle larger than 0 degrees and equal to or smaller than 45 degrees, more preferably at an angle larger than 0 degrees and equal to or smaller than 20 degrees, with respect to the axial direction X of the cylinder member 21.

Thereafter, the second layer of the fiber bundles F4 is formed by a method similar to that for the first layer. When forming the second layer, the portions of the fiber bundles F4 on the first end side (feed part 400 side) are rotated in the second direction, and the portions of the fiber bundles F4 on the second end side (holding member 410 side) are rotated in the first direction. In the case where the third and subsequent layers of the fiber bundles F4 are formed, odd-numbered layers (first tilted layers) are formed in a manner similar to that of the first layer, and even-numbered layers (second tilted layers) are formed in a manner similar to that of the second layer.

The number of layers of the fiber bundles F4 is not particularly limited as long as the additional reinforcing layer 13 has sufficient strength. However, the number of layers of the fiber bundles F4 is preferably, for example, 2 to 12, and more preferably 2. The smaller the number of layers of the fiber bundles F4 is, the more preferable, as long as the additional reinforcing layer 13 has sufficient strength. It is preferable that the number of first tilted layers and the number of second tilted layers be the same. The first tilted layer is formed with the fiber bundles F4 being tilted with respect to the axial direction X under predetermined tension, and is later cured with the fiber bundles F4 in the tilted state. Accordingly, when an expansive force is applied to the additional reinforcing layer 13 by the gas pressure, the first tilted layer is subjected to a force in such a direction that the tilt of the fiber bundles F4 of the first tilted layer with respect to the axial direction X is eliminated. As a result, the reinforcing body 20 is distorted. Similarly, the second tilted layer is formed with the fiber bundles F4 being tilted in the opposite direction to the fiber bundles F4 of the first tilted layer under predetermined tension, and is later cured with the fiber bundles F4 in the tilted state. Accordingly, when the expansive force is applied to the additional reinforcing layer 13 by the gas pressure, the second tilted layer is subjected to a force in such a direction that the tilt of the fiber bundles F4 of the second tilted layer in the opposite direction to the tilt of the fiber bundles F4 of the first tilted layer is eliminated. As a result, the reinforcing body 20 is distorted. The fiber bundles F4 of the first tilted layer and the fiber bundles F4 of the second tilted layer are tilted in opposite directions. Accordingly, when the expansive force is applied to the additional reinforcing layer 13 by the gas pressure, the force in such a direction that the tilt of the fiber bundles F4 of the first tilted layer is eliminated and the force in such a direction that the tilt of the fiber bundles F4 of the second tilted layer is eliminated act to cancel each other out. This reduces distortion of the fiber-reinforced resin layer 12 and therefore reduces distortion of the high-pressure tank 10. This configuration thus restrains reduction in strength of the high-pressure tank 10.

In this example, the number of first tilted layers and the number of second tilted layers are the same. Accordingly, the force in such a direction that the tilt of the fiber bundles F4 of the first tilted layer is eliminated and the force in such a direction that the tilt of the fiber bundles F4 of the second tilted layer is eliminated effectively act to cancel each other out. This effectively reduces distortion of the fiber-reinforced resin layer 12 due to the tilt of the fiber bundles F4 and therefore effectively restrains reduction in strength of the high-pressure tank 10. The number of first tilted layers may be different from the number of second tilted layers. For example, only the first tilted layer(s) or only the second tilted layer(s) may be formed.

A predetermined number of layers of the fiber bundles F4 is formed to form the additional reinforcing layer 13. Thereafter, the reinforcing body 20 and the additional reinforcing layer 13 are heated and cured, for example, at 100° C. to 170° C. for 10 to 120 minutes. At this time, the adhesive 300 penetrates into the reinforcing body 20 and the additional reinforcing layer 13.

As described above, the additional reinforcing layer 13 has fibers placed across the two dome members 22, 23. The fibers in the additional reinforcing layer 13 suppress separation of the dome members 22, 23 from the cylinder member 21. The dome members 22, 23 are thus restrained from coming off from both end portions of the cylinder member 21 by the gas pressure. The amount of fibers in the additional reinforcing layer 13 need only be large enough to suppress coming off of the dome members 22, 23 from the cylinder member 21. Accordingly, the usage of the fiber-reinforced resin is reduced as compared to the helical layers in the cylinder section of the conventional high-pressure tank.

According to the additional reinforcing layer forming step S4, the additional reinforcing layer 13 is formed on the outer surface of the reinforcing body 20 without rotating the reinforcing body 20 in the circumferential direction. Accordingly, a structure for rotating the reinforcing body 20 (typically, a boss to which a rotating shaft is attached) need not be provided on the opposite end of the high-pressure tank 10 from the through hole 22b.

In the example described above, as shown in FIGS. 14 and 15, the additional reinforcing layer 13 is formed on the outer surface of the reinforcing body 20 by rotating the fiber bundles F4 in the circumferential direction of the reinforcing body 20. However, the additional reinforcing layer 13 may be formed by other methods. For example, the additional reinforcing layer 13 may be formed using what is called sheet winding, namely by winding a resin-impregnated fiber sheet around the reinforcing body 20. In this case, fibers in the fiber sheet are preferably oriented in the axial direction X of the cylinder member 21. However, like the fiber bundles F4, the fibers in the fiber sheet may be oriented at an angle larger than 0 degrees and equal to or smaller than 45 degrees with respect to the axial direction X of the cylinder member 21, or may be oriented at an angle larger than 0 degrees and equal to or smaller than 20 degrees with respect to the axial direction X of the cylinder member 21. In the case where the additional reinforcing layer 13 is formed using the fiber bundles F4 or the fiber sheet, the fibers may be oriented parallel to the axial direction X. The additional reinforcing layer 13 may be formed on the outer surface of the reinforcing body 20 by the FW process. In the case where the FW process is used, however, it is preferable to cure the reinforcing body 20 before forming the additional reinforcing layer 13 in order to suppress deformation of the reinforcing body 20.

Figure 16:
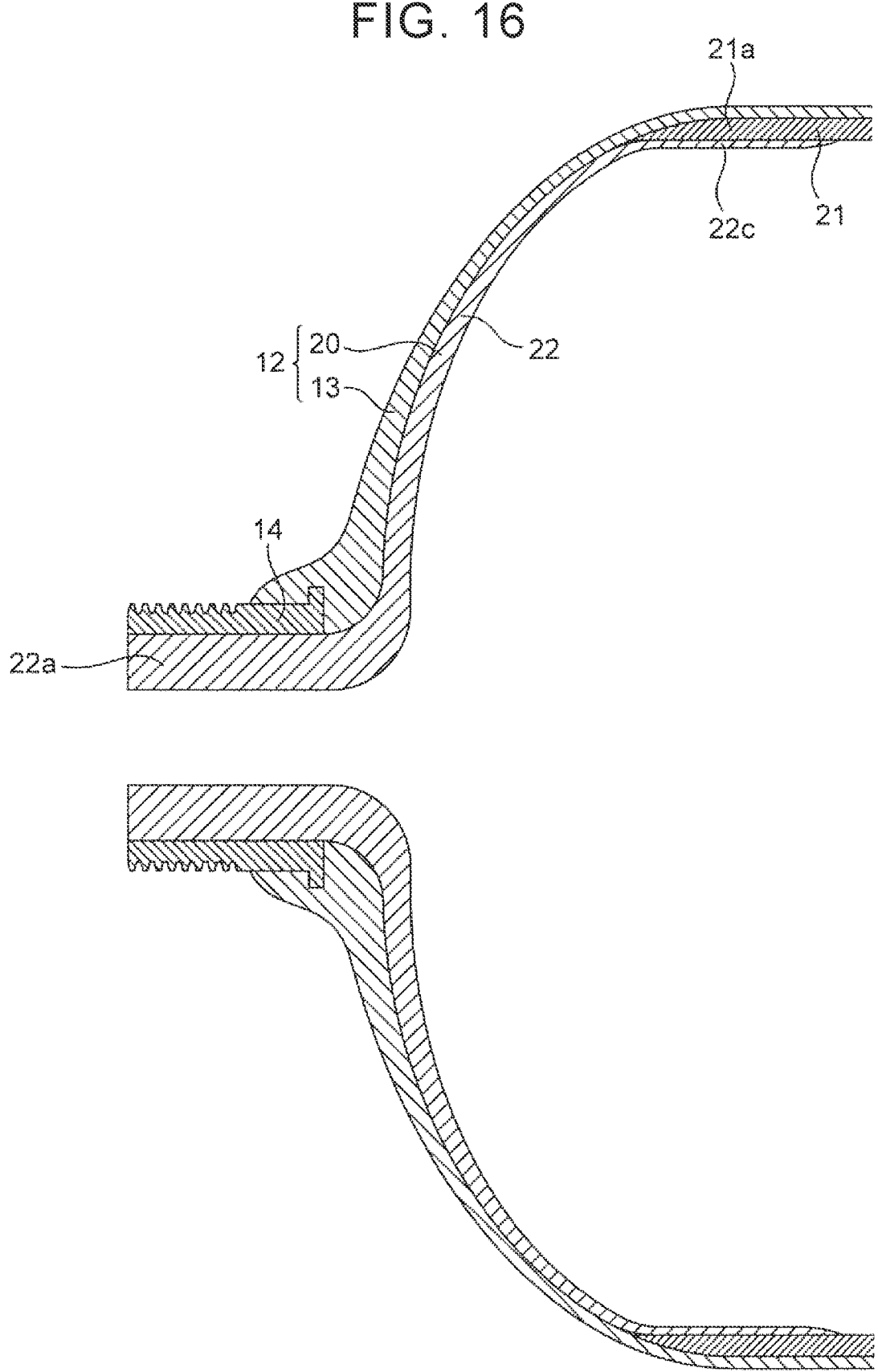
FIG. 16 is a sectional view illustrating a method for manufacturing a high-pressure tank according to a first modification of the disclosure.

In the example described above, as shown in FIG. 2, one end of the additional reinforcing layer 13 (the end on the boss 14 side, the first ends of the fiber bundles F4) extends to a position immediately before the boss 14. However, as in a first modification shown in FIG. 16, the one end of the additional reinforcing layer 13 may cover a part of the outer surface of the boss 14. With this configuration, the boss 14 can be held by the additional reinforcing layer 13. Coming off of the boss 14 from the reinforcing body 20 can therefore reliably be suppressed.

Figure 17:
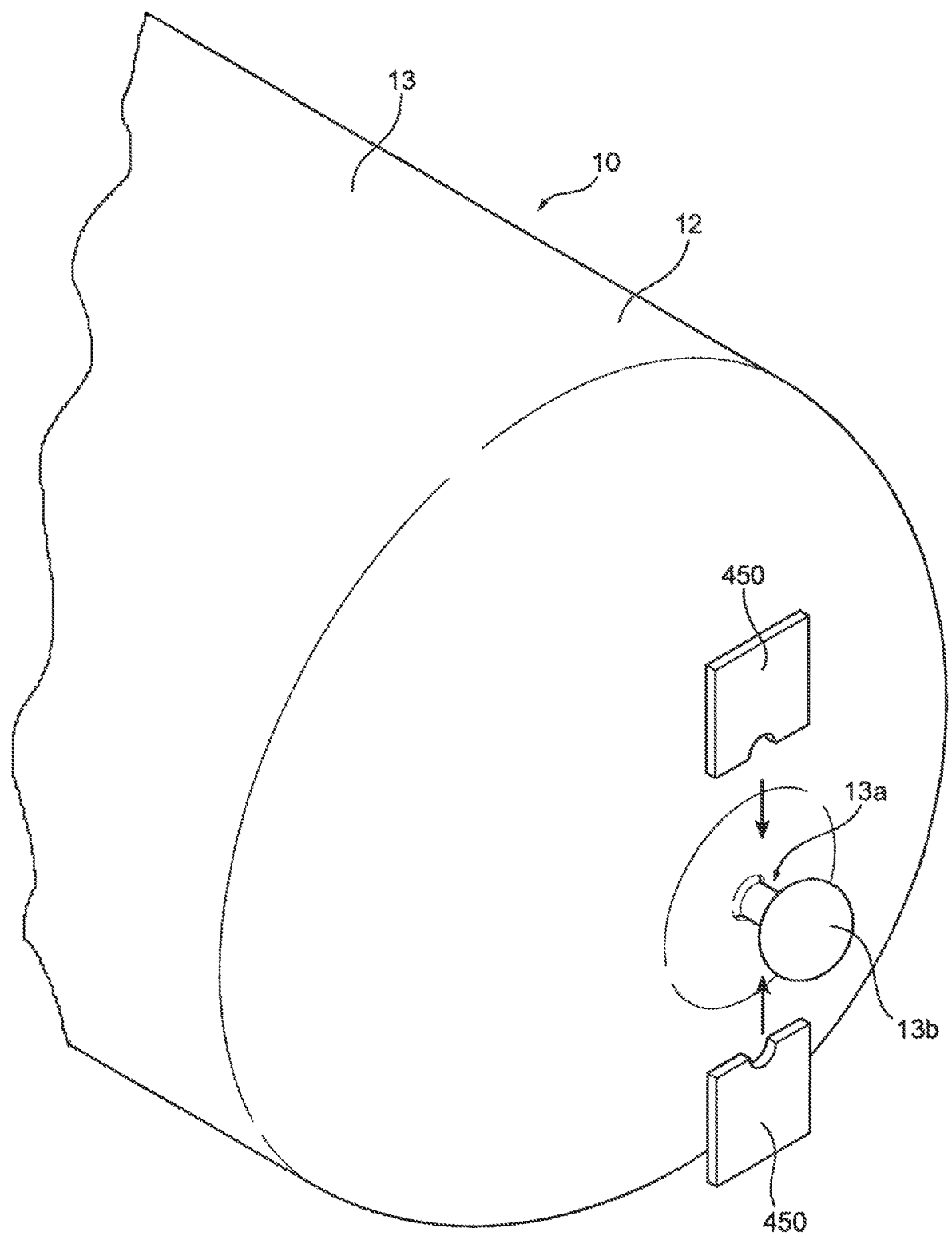
FIG. 17 is a perspective view illustrating a method for manufacturing a high-pressure tank according to a second modification of the disclosure.

In the example described above, as shown in FIG. 1, the other end of the additional reinforcing layer 13 (the opposite end from the boss 14, the second ends of the fiber bundles F4) has a smooth, generally spherical surface. However, as in a second modification shown in FIG. 17, the other end of the additional reinforcing layer 13 may have a protrusion 13b with a recessed portion 13a. With this configuration, the other end of the additional reinforcing layer 13 can be held by, for example, holding member 450 shown in FIG. 17. This improves workability in a later step and improves mountability of the high-pressure tank 10 on a fuel cell vehicle. The protrusion 13b with the recessed portion 13a can be easily formed by adjusting the cutting position when cutting the fiber bundles F4 in the state shown in FIG. 15.

Figure 18:
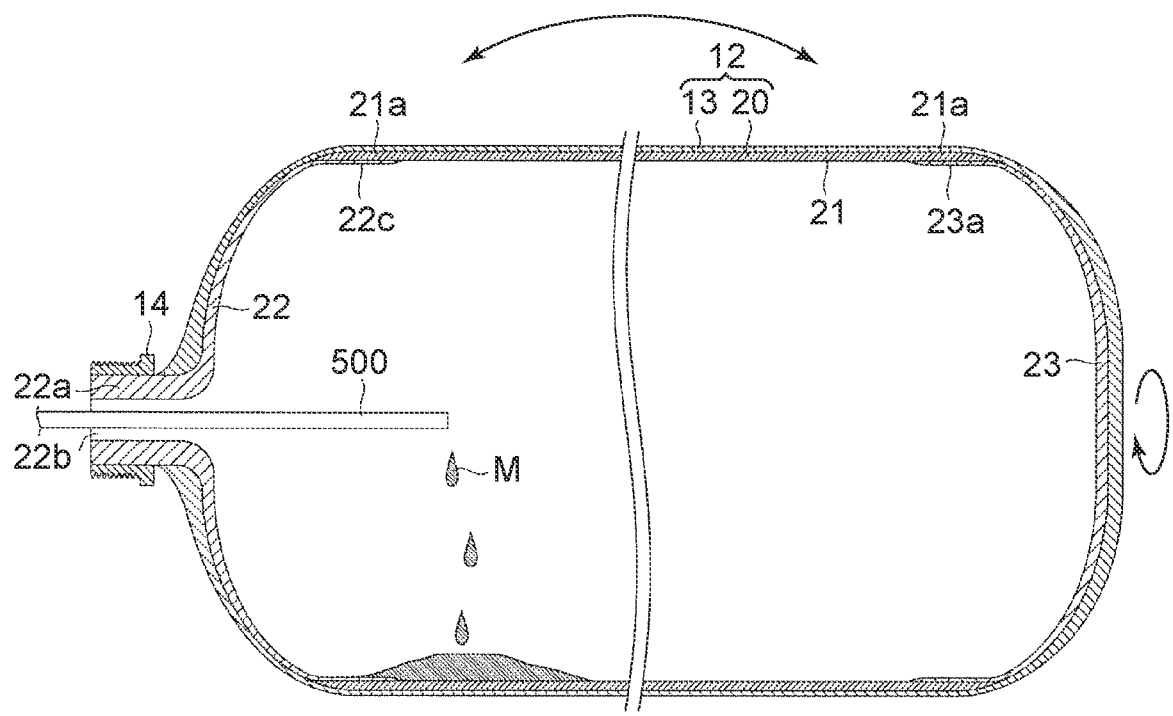
FIG. 18 is a sectional view illustrating a liner forming step of the method for manufacturing a high-pressure tank according to the embodiment of the disclosure.

In the liner forming step S5 that is performed in some cases, as shown in FIG. 18, a resin material M is introduced into the fiber-reinforced resin layer 12 through the through hole 22b in the protruding portion 22a of the reinforcing body 20. The resin material M is then solidified while rotating the fiber-reinforced resin layer 12. The liner 11 is formed in this manner.

Specifically, the internal space of the fiber-reinforced resin layer 12 communicates with the outside space through the through hole 22b. A nozzle 500 that discharges the resin material M is inserted through the through hole 22b, and the resin material M is introduced into the internal space of the fiber-reinforced resin layer 12 through the nozzle 500. The nozzle 500 is then removed from the through hole 22b.

As described above, the resin material M is preferably a resin having satisfactory gas barrier properties. Examples of such a resin include thermoplastic resins such as polyamide, polyethylene, ethylene-vinyl alcohol copolymer resin, and polyester and thermosetting resins such as epoxy, and polyamide is preferred. The resin material M may be a resin material that is fluid at normal temperature or may be a powdery material.

The reinforcing body 20 is then rotated such that the resin material M covers the inner surface of the reinforcing body 20. Specifically, the internal space of the fiber-reinforced resin layer 12 is heated to a predetermined temperature or higher as necessary. With the resin material M having low viscosity (0 to 0.05 Pa·s) and being fluid, the fiber-reinforced resin layer 12 is rotated in the circumferential direction about its axis extending in the horizontal direction, while moving both ends of the fiber-reinforced resin layer 12 alternately up and down (see FIG. 18). As the fiber-reinforced resin layer 12 is rotated, the inner surface of the fiber-reinforced resin layer 12 moves upward with the fluid resin material M thereon, and a part of the resin material M flows down the inner surface of the fiber-reinforced resin layer 12 due to its own weight. The resin material M is thus brought into contact with, and covers, the entire inner surface of the reinforcing body 20. In the case where the resin material M is a thermosetting resin, the internal space of the fiber-reinforced resin layer 12 is heated to cure the resin material M. The liner 11 is thus formed. In the case where the resin material M is a thermoplastic resin, the internal space of the fiber-reinforced resin layer 12 is cooled to solidify the resin material M that is in contact with, and covers, the inner surface of the fiber-reinforced resin layer 12. The liner 11 is thus formed. In this example, the liner 11 is formed by reaction injection molding using two or more kinds of low molecular weight, low viscosity liquid materials that are fluid at normal temperature as the resin material M. In this case, the internal space of the fiber-reinforced resin layer 12 is heated to produce a polymer from a monomer. The internal space of the fiber-reinforced resin layer 12 is then cooled to solidify the polymer. The liner 11 is thus formed.

According to the liner forming step S5, the liner 11 can be easily formed inside the fiber-reinforced resin layer 12 even after the fiber-reinforced resin layer 12 is formed. Moreover, no mold for molding the liner is necessary unlike the case where the liner is formed by injection molding using resin.

The high-pressure tank 10 is completed by attaching the valve 15 to the boss 14.

The embodiment disclosed herein should be construed as illustrative in all respects, not restrictive. The scope of the disclosure is not defined by the above description of the embodiment but by the claims, and includes all modifications and variations that are made without departing from the spirit and scope of the claims.

Figure 19:
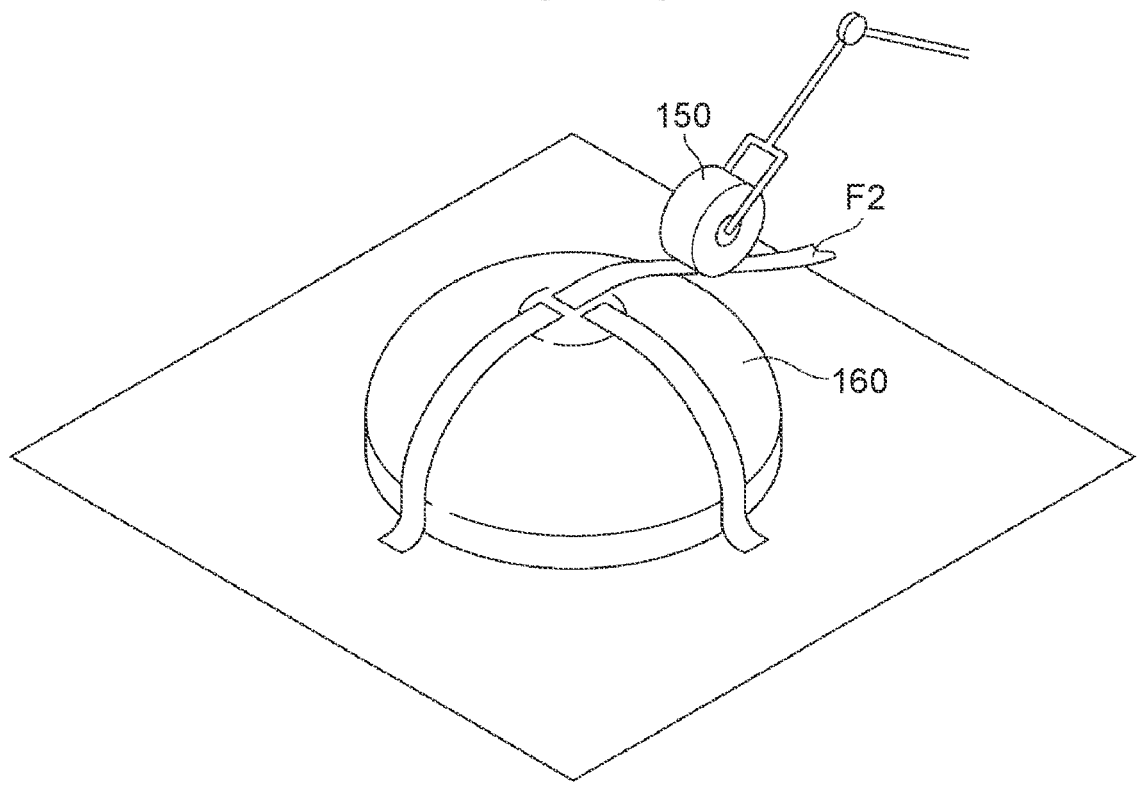
FIG. 19 is a perspective view illustrating a method for manufacturing a high-pressure tank according to a third modification of the disclosure.

For example, in the example described in the above embodiment, the two dome members 22, 23 are formed by the filament winding process in the dome member forming step S2. However, the disclosure is not limited to this. For example, as in a third modification of the disclosure shown in FIG. 19, the two dome members 22, 23 may be formed by a tape placement process, namely by pressing and applying the fiber bundle F2 to the surface of a dome-shaped die (predetermined die) 160 using a roller 150. In this case, a plurality of dies (e.g., two dies) with different shapes can be used according to the shapes of the dome members 22, 23. That is, the two dome members 22, 23 can be formed using at least one die (one or more dies).

Figure 20:
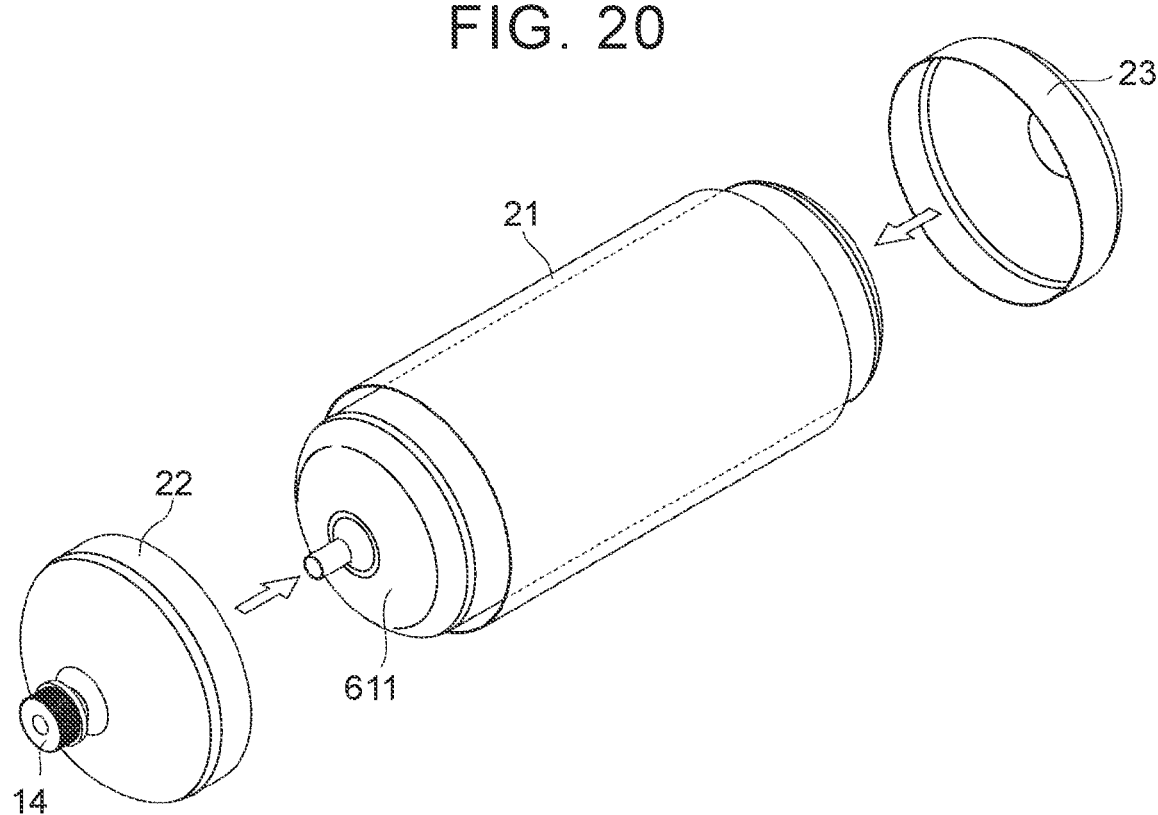
FIG. 20 is a perspective view illustrating a method for manufacturing a high-pressure tank according to a fourth modification of the disclosure.

In the example described in the above embodiment, the liner 11 is formed after the reinforcing body 20 and the additional reinforcing layer 13 are formed in the liner forming step S5. However, the disclosure is not limited to this. For example, as in a fourth modification of the disclosure shown in FIG. 20, when combining both end portions 21a of the cylinder member 21 and the end portions 22c, 23a of the two dome members 22, 23 in the joining step S3, the cylinder member 21 and the dome members 22, 23 may be fitted to cover a resin liner 611 formed in advance. In this case, the liner forming step S5 is not performed. The liner 611 can be formed by a known manufacturing method. The strength of the liner 611 need not be increased because no fiber bundle is wound around the liner 611 by the FW process. Accordingly, the thickness of the liner 611 can be reduced as compared to the conventional liner. The liner 611 may be made of a metal material such as aluminum alloy instead of the resin material.

In this manufacturing method, the outside diameter of the liner 611 is made slightly smaller than the inside diameter of the cylinder member 21 such that the liner 611 can be easily inserted through the cylinder member 21. Accordingly, with the liner 611 covered by the cylinder member 21 and the two dome members 22, 23, there is clearance between the inner surface of the reinforcing body 20 and the outer surface of the liner 611. However, in the high-pressure tank 10 (the liner 611) filled with hydrogen gas, the liner 611 expands due to the gas pressure, and the inner surface of the reinforcing body 20 is therefore kept in close contact with the outer surface of the liner 611.

Figure 21:
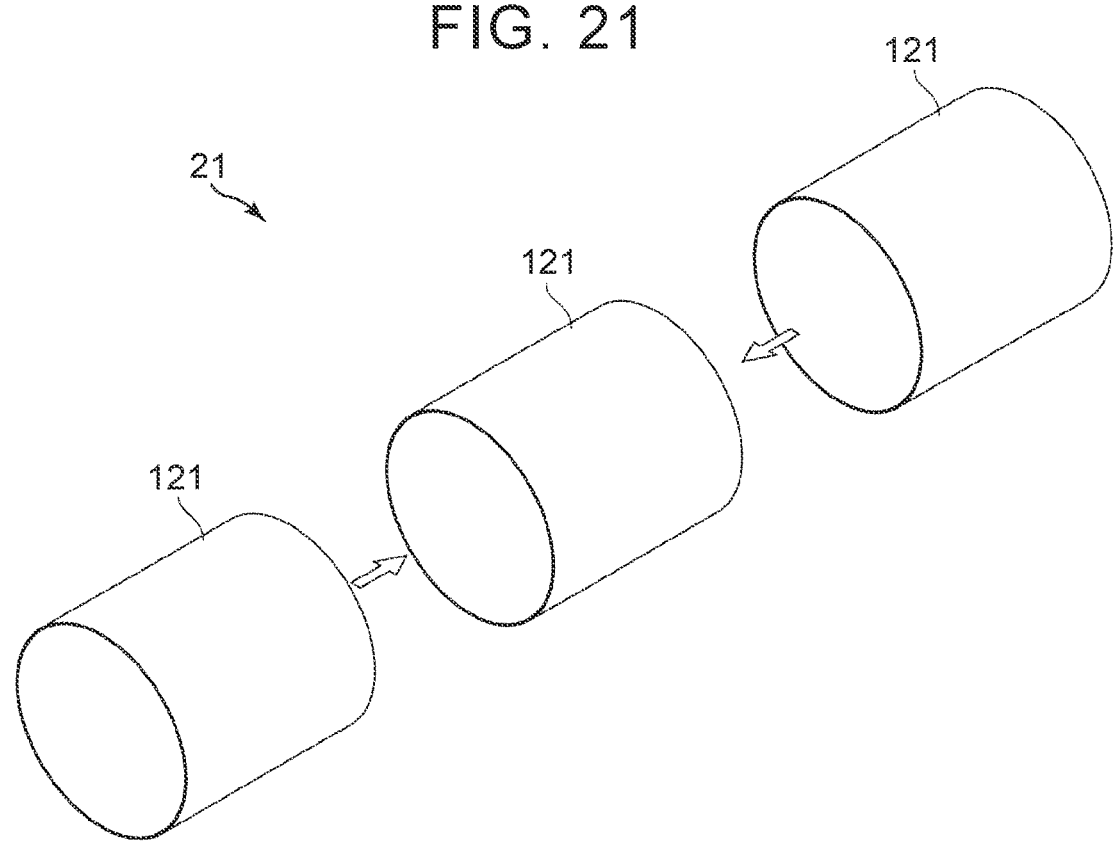
FIG. 21 is a perspective view illustrating a method for manufacturing a high-pressure tank according to a fifth modification of the disclosure.

In the example described in the above embodiment, the cylinder member 21 is composed of a single member. However, the disclosure is not limited to this. For example, as in a fifth modification of the disclosure shown in FIG. 21, the cylinder member 21 may be formed by connecting two or more (three in FIG. 21) cylinder bodies 121. In this case, the two or more cylinder bodies 121 may first be joined to form the cylinder member 21, and the dome members 22, 23 may then be joined to both end portions of the cylinder member 21. Alternatively, the cylinder bodies 121 may first be joined to the dome members 22, 23, one cylinder body 121 to each dome member 22, 23, and the resultant members may then be joined together. The cylinder bodies 121 can be formed by a method similar to that for the cylinder member 21 described above. That is, the cylinder bodies 121 are made of a fiber-reinforced resin and, in some cases, a release material, and has fibers oriented in the circumferential direction. As in the case where the cylinder member 21 and the dome members 22, 23 are joined together, the cylinder bodies 121 may be connected together with an end portion of one of the cylinder bodies 121 fitted in an end portion of the other cylinder body 121. Alternatively, the cylinder bodies 121 may be made to abut on each other and bonded together using an adhesive. For example, in the case where a plurality of types of cylinder bodies 121 with different lengths or sizes are formed, a plurality of dies with different lengths or sizes can be used according to the types of cylinder bodies 121. That is, the cylinder member 21 can be formed using at least one die (one or more dies).

In the example described in the above embodiment, the end portions 21a of the cylinder member 21 and the end portions 22c, 23a of the dome members 22, 23 are fitted together in the joining step S3. However, the disclosure is not limited to this. The end portions 21a of the cylinder member 21 and the end portions 22c, 23a of the dome members 22, 23 may be made to abut on each other and bonded together using an adhesive.

Figure 22:
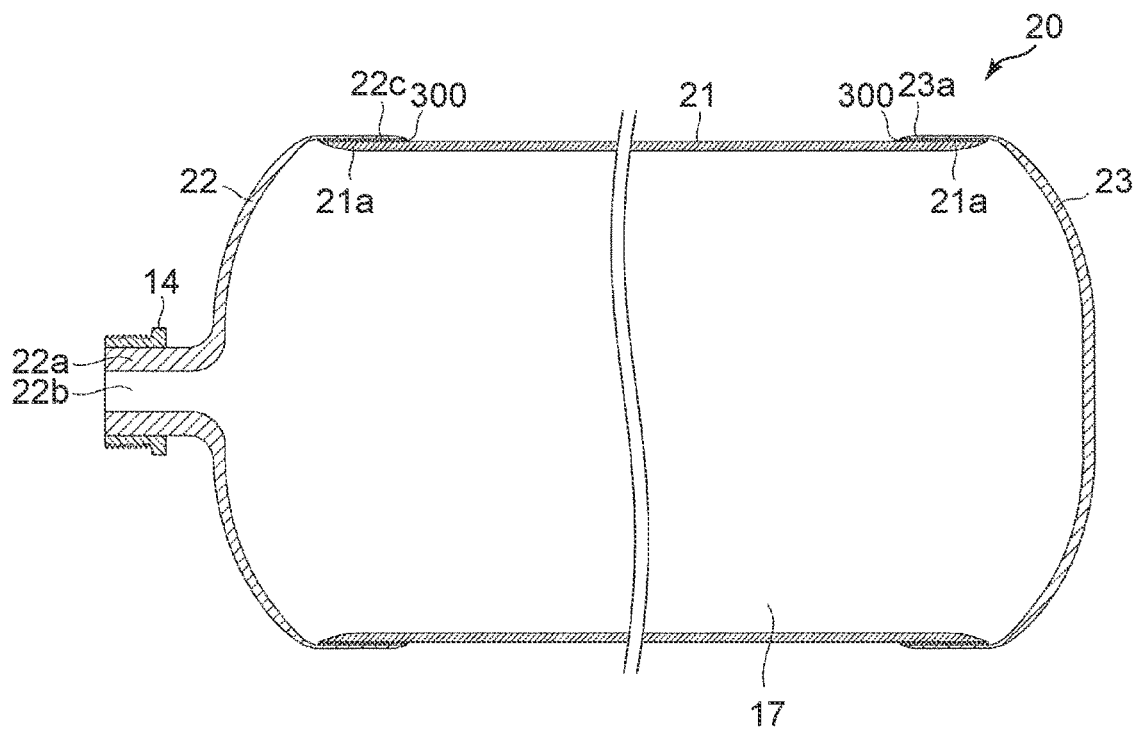
FIG. 22 is a sectional view illustrating a method for manufacturing a high-pressure tank according to a sixth modification of the disclosure.

In the example described in the above embodiment, after thermally curing the dome members 22, 23, the dome members 22, 23 and the cylinder member 21 are joined together with the end portions 22c, 23a of the dome members 22, 23 fitted in the end portions 21a of the cylinder member 21. However, the disclosure is not limited to this. As in a sixth modification of the disclosure shown in FIG. 22, after thermally curing the cylinder member 21, the cylinder member 21 and the dome members 22, 23 may be joined together with the end portions 21a of the cylinder member 21 fitted in the end portions 22c, 23a of the dome members 22, 23. In this case, the cylinder member 21 and the dome members 22, 23 can be easily fitted together. Moreover, the outer shape of the dome members 22, 23 can be adjusted or the dome members 22, 23 can be brought into close contact with the cylinder member 21.

In the example described in the above embodiment, the liner 11 is formed in the liner forming step S5 by rotating the fiber-reinforced resin layer 12 such that the fluid resin material covers the entire inner surface of the fiber-reinforced resin layer 12. However, the disclosure is not limited to this. For example, the liner 11 may be formed by blow molding or thermal spraying. In blow molding, the liner 11 is formed by extruding a thermoplastic resin material, softened by heating, in a tubular shape into the fiber-reinforced resin layer 12 through the through hole 22b, blowing compressed air into the tubular resin material such that the resin material contacts and covers the inner surface of the fiber-reinforced resin layer 12, and solidifying the resin material. In thermal spraying, the liner 11 is formed by spraying a liquid or softened resin material onto the inner surface of the fiber-reinforced resin layer 12.

In the example described in the above embodiment, the liner 11 is formed after the additional reinforcing layer 13 is formed on the outer surface of the reinforcing body 20. However, the disclosure is not limited to this. The additional reinforcing layer 13 may be formed on the outer surface of the reinforcing body 20 after the liner 11 is formed inside the reinforcing body 20. In this case, it is preferable that the liner 11 be made of a thermosetting resin such as epoxy such that the liner 11 is not softened during curing of the additional reinforcing layer 13.

In the example described in the above embodiment, the dome member 22 with the through hole 22b is formed in the dome member forming step S2. However, the disclosure is not limited to this. For example, the through hole 22b may be formed in the fiber-reinforced resin layer 12 after the joining step S3.

Figure 23:
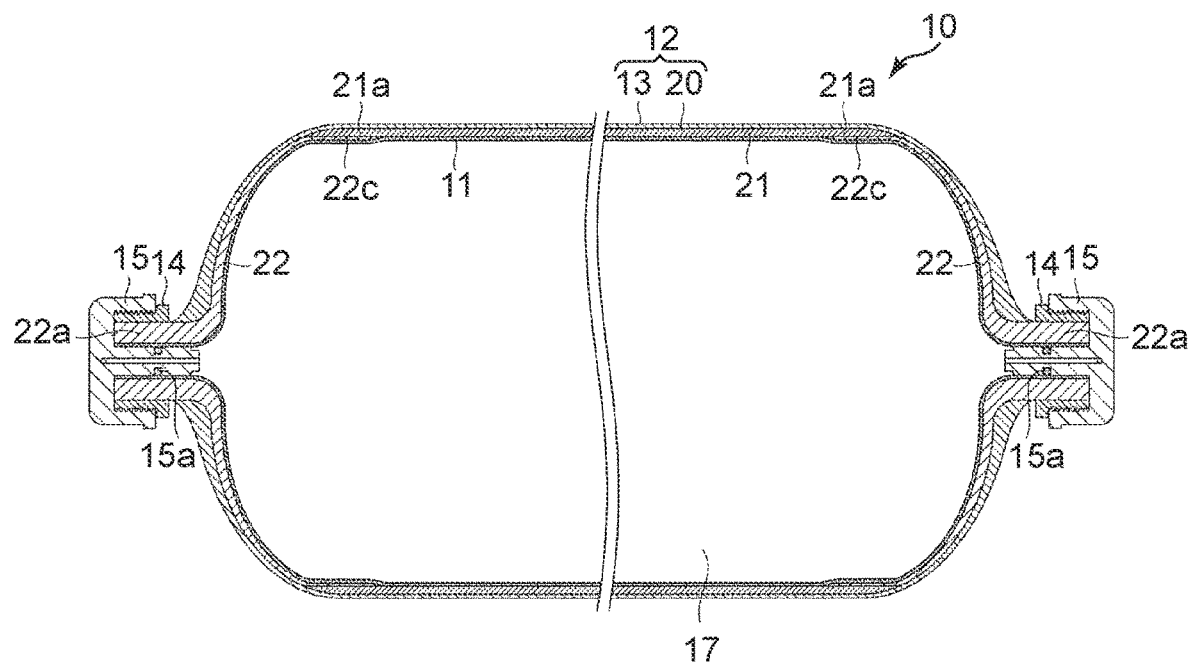
FIG. 23 is a sectional view illustrating a method for manufacturing a high-pressure tank according to a seventh modification of the disclosure.
Figure 24:
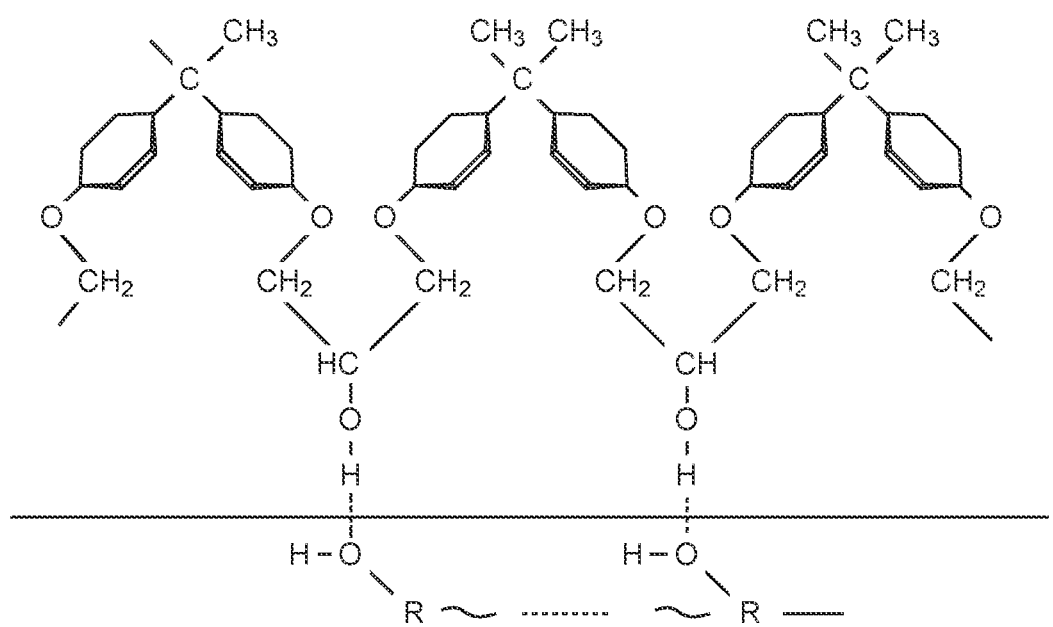
FIG. 24 schematically illustrates a presumed mechanism of bonding of a fiber-reinforced resin to a mandrel.

In the example described in the above embodiment, the through hole 22b is formed only in the dome member 22, and the boss 14 is attached to only one end of the high-pressure tank 10. However, the disclosure is not limited to this. As in a seventh modification of the disclosure shown in FIG. 23, a through hole may be formed in both of the two dome members 22, 23, and a boss may be attached to both one end and the other end of the high-pressure tank 10.

What is claimed is:

1. A method for manufacturing a high-pressure tank including a liner configured to store gas and a reinforcing layer made of a fiber-reinforced resin and configured to cover an outer surface of the liner, the method comprising:
    a first step of forming a cylinder member made of the fiber-reinforced resin;
    a second step of forming two dome members made of the fiber-reinforced resin; and
    a third step of forming a reinforcing body that is the reinforcing layer by joining both end portions of the cylinder member and end portions of the two dome members, respectively, wherein
    the first step includes forming the cylinder member by winding a release material around a mandrel and winding the fiber-reinforced resin on the release material,
    the release material in the first step is made of a resin having gas barrier properties, and
    end portions of the release material contact each other to form a joint portion,
    wherein the fiber-reinforced resin includes gas barrier properties having a multilayer structure with an ethylene-vinyl alcohol copolymer resin interposed between polyamide.

2. The method according to claim 1, wherein the release material in the first step has a surface that is treated.

3. The method according to claim 1, wherein the release material includes a polyamide (PA) and an ethylene-vinyl alcohol copolymer resin (EVOH).

4. A method for manufacturing a high-pressure tank including a liner configured to store gas and a reinforcing layer made of a fiber-reinforced resin and configured to cover an outer surface of the liner, the method comprising:
    a first step of forming a cylinder member made of the fiber-reinforced resin;
    a second step of forming two dome members made of the fiber-reinforced resin; and
    a third step of forming a reinforcing body that is the reinforcing layer by joining both end portions of the cylinder member and end portions of the two dome members, respectively, wherein
    the first step includes forming the cylinder member by winding a release material around a mandrel and winding the fiber-reinforced resin on the release material,
    the release material in the first step is made of a resin having gas barrier properties, and
    end portions of the release material contact each other to form a joint portion,
    wherein the fiber-reinforced resin that includes gas barrier properties, and the method further comprising the steps of:
    welding the end portions of the release material included in the cylinder member; and
    welding end portions of the fiber-reinforced resin that is placed on an inner surface of the two dome members.

* * * * *